United States Patent
Mochizuki et al.

(10) Patent No.: US 10,690,183 B2
(45) Date of Patent: Jun. 23, 2020

(54) MOTION GUIDE DEVICE

(71) Applicant: THK CO., LTD., Tokyo (JP)

(72) Inventors: Hiroaki Mochizuki, Tokyo (JP); Eiji Hosaka, Tokyo (JP); Hiroomi Kuribayashi, Tokyo (JP); Toshiro Minami, Tokyo (JP); Akito Kaneko, Tokyo (JP)

(73) Assignee: THK CO., LTD, Tokyo (JP)

( * ) Notice: Subject to any disclaimer, the term of this patent is extended or adjusted under 35 U.S.C. 154(b) by 0 days.

(21) Appl. No.: 16/333,360

(22) PCT Filed: Aug. 18, 2017

(86) PCT No.: PCT/JP2017/029663
§ 371 (c)(1),
(2) Date: Mar. 14, 2019

(87) PCT Pub. No.: WO2018/051724
PCT Pub. Date: Mar. 22, 2018

(65) Prior Publication Data
US 2019/0211870 A1 Jul. 11, 2019

(30) Foreign Application Priority Data

Sep. 16, 2016 (JP) ................................ 2016-182195
Dec. 28, 2016 (JP) ................................ 2016-255740

(51) Int. Cl.
*F16C 29/06* (2006.01)
*F16C 29/08* (2006.01)
*F16C 29/10* (2006.01)

(52) U.S. Cl.
CPC ............ *F16C 29/064* (2013.01); *F16C 29/06* (2013.01); *F16C 29/0607* (2013.01); *F16C 29/086* (2013.01); *F16C 29/10* (2013.01)

(58) Field of Classification Search
CPC .... F16C 29/005; F16C 29/06; F16C 29/0602; F16C 29/0607; F16C 29/0609;
(Continued)

(56) References Cited

U.S. PATENT DOCUMENTS 5,011,300 A * 4/1991 Teramachi ............ F16C 29/007
384/25
5,800,065 A 9/1998 Lyon
(Continued)

FOREIGN PATENT DOCUMENTS

AU 2004 235 657 A1 1/2005
DE 93 20 181 U1 5/1994
(Continued)

OTHER PUBLICATIONS

International Search Report dated Sep. 12, 2017, issued in counterpart application No. PCT/JP2017/029663 (2 pages).
(Continued)

*Primary Examiner* — James Pilkington
(74) *Attorney, Agent, or Firm* — Westerman, Hattori, Daniels & Adrian, LLP

(57) ABSTRACT

In this motion guide device (10), a track member (20) has a recess or protrusion (51) that is formed in a longitudinal direction, and a moving member (30) has a holding protrusion or holding recess (53) that corresponds to the recess or protrusion (51) formed in the track member (20). When force is applied in a direction that would cause relative separation of the moving member (30) and the track member (20), the holding protrusion or holding recess (53) holds onto the recess or protrusion (51) such that the moving member (30) and the track member (20) are unable to be separated. With this configuration, a motion guide device that is both compact and capable of withstanding a strong external load can be obtained.

8 Claims, 20 Drawing Sheets

(58) Field of Classification Search
CPC .............. F16C 29/064; F16C 29/0642; F16C 29/0657; F16C 29/086; F16C 29/10
See application file for complete search history.

(56) References Cited

U.S. PATENT DOCUMENTS

| | | | | |
|---|---|---|---|---|
| 8,033,730 | B2 * | 10/2011 | Kakei | .................. F16C 29/065 384/44 |
| 2007/0133910 | A1 | 6/2007 | Xu et al. | |
| 2014/0301677 | A1 | 10/2014 | Furusawa et al. | |

FOREIGN PATENT DOCUMENTS

| | | | |
|---|---|---|---|
| DE | 10051004 | * | 4/2002 |
| DE | 11 2012 004674 T5 | | 9/2014 |
| JP | 53-88438 A | | 8/1978 |
| JP | 62-141308 A | | 6/1987 |
| JP | 2000-193023 A | | 7/2000 |
| JP | 2005-201333 A | | 7/2005 |
| JP | 2006-17253 A | | 1/2006 |
| JP | 2015-110990 A | | 6/2015 |

OTHER PUBLICATIONS

Extended (Supplementary) European Search Report dated Jul. 12, 2019, issued in counterpart EP application No. 17850630.9. (8 pages).

* cited by examiner

MOTION GUIDE DEVICE

TECHNICAL FIELD

The present invention relates to a motion guide device.

BACKGROUND ART

Motion guide devices are provided with a track rail, which serves as a track member, formed with a rolling member rolling surface in the longitudinal direction, and with a movable block, which serves as a moving member. The movable block is assembled to the track rail so as to be capable of linear motion. A plurality of rolling members for reducing frictional resistance are interposed between the track rail and the movable block so as to be capable of rolling motion. A circuitous endless circulation passage in a motion guide device is configured by a loaded rolling member rolling passage between the rolling member rolling surface of the track rail and the loaded rolling member rolling surface of the movable block, a rolling member return passage that extends parallel to the loaded rolling member rolling passage, and a pair of U-shaped turnabout passages that connect the loaded rolling member rolling passage and the rolling member return passage (for example, see Patent Literature 1).

CITATION LIST

Patent Literature

Patent Literature 1: JP 2005-201333 A

DISCLOSURE OF THE INVENTION

Problems to be Solved by the Invention

Conventionally, in situations in which this kind of motion guide device is to be applied where there is a chance that a strong external load will be applied, there has been no choice but to increase the size of the motion guide device so as to be able to withstand this load. However, in modern industry there are increasing demands to expand the range of application of motion guide devices, and the realization of a motion guide device that is both compact and capable of withstanding a strong external load has been desired.

The present invention has been made in view of the above-described circumstances, and an object hereof is to provide a motion guide device that is both compact and capable of withstanding a strong external load.

Means for Solving the Problems

A motion guide device according to the invention includes: a track member formed with a rolling member rolling surface in a longitudinal direction; a moving member that has a loaded rolling member rolling surface opposing the rolling member rolling surface of the track member, a rolling member return passage that extends parallel to a direction in which the rolling member rolling surface extends, and a turnabout passage that connects the loaded rolling member rolling surface and the rolling member return passage together; and a plurality of rolling members that roll through an endless circulation passage formed by a loaded rolling member rolling passage made of the rolling member rolling surface and the loaded rolling member rolling surface, the rolling member return passage, and the pair of turnabout passages, in which the track member has a recess or a protrusion formed in the longitudinal direction, the moving member has a holding protrusion or a holding recess that corresponds to the recess or the protrusion formed to the track member, and when force is applied in a direction that would cause relative separation of the moving member and the track member, the holding protrusion or the holding recess holds onto the recess or the protrusion such that the moving member and the track member are unable to be separated.

Effects of the Invention

The present invention enables a motion guide device that is both compact and capable of withstanding a strong external load to be provided.

BRIEF DESCRIPTION OF THE DRAWINGS

FIG. 13(a) is a diagram illustrating a state in which the movable block has been secured, and FIG. 13(b) illustrates a state in which the movable block has been released.

FIG. 18 is a schematic perspective view of relevant parts of a motion guide device according to a modified configuration of the present invention.

FIG. 19 is a frontal view of the motion guide device according to the modified configuration of the present invention.

FIG. 20 is a frontal view of further improved configuration of the motion guide device according to the modified configuration of the present invention.

MODE FOR CARRYING OUT THE INVENTION

Hereinafter, a preferred embodiment for carrying out the present invention will be described with reference to the drawings. It should be noted that the embodiment below does not limit the invention as set forth in the claims. Further, it is not necessarily the case that all combinations of the features described in the embodiment are essential to the solving means of the invention.

Figure 1:
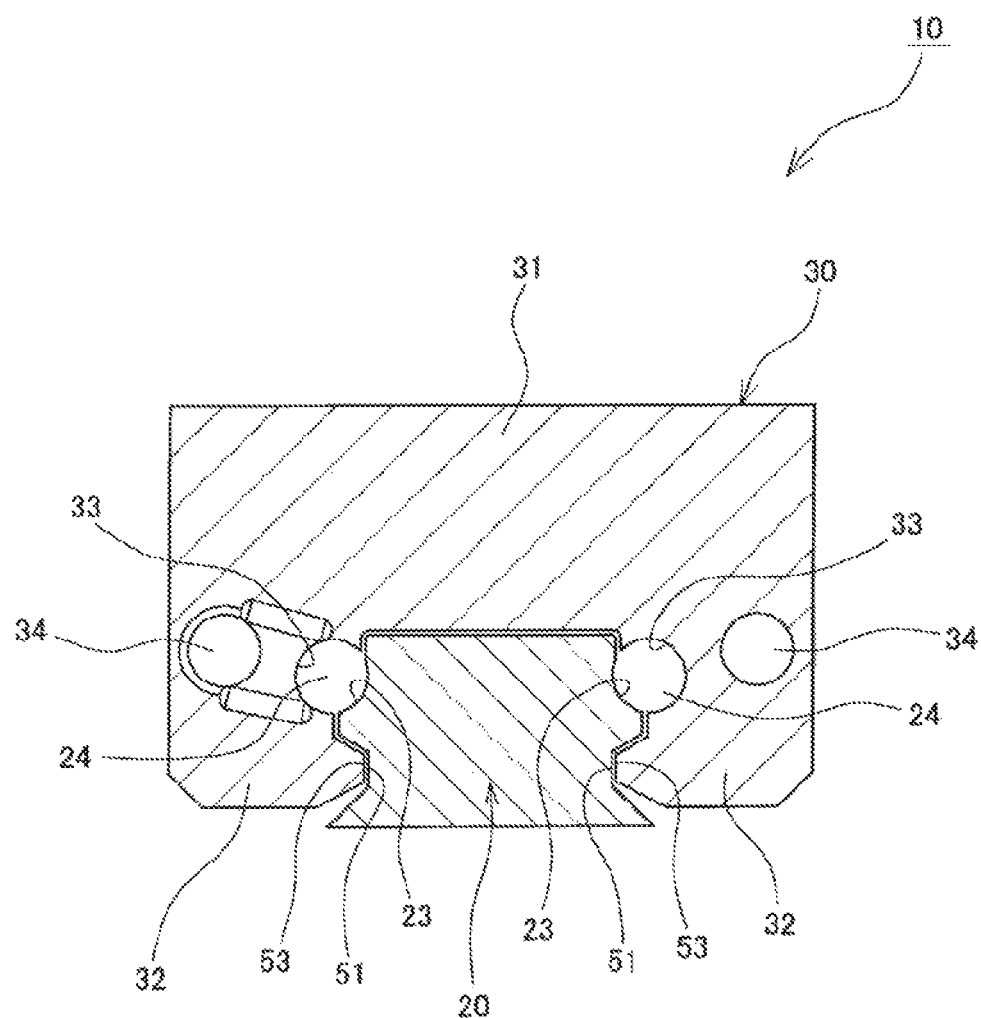
FIG. 1 is a frontal cross-sectional view of a track rail and a movable block provided to a motion guide device according to an embodiment.
Figure 2:
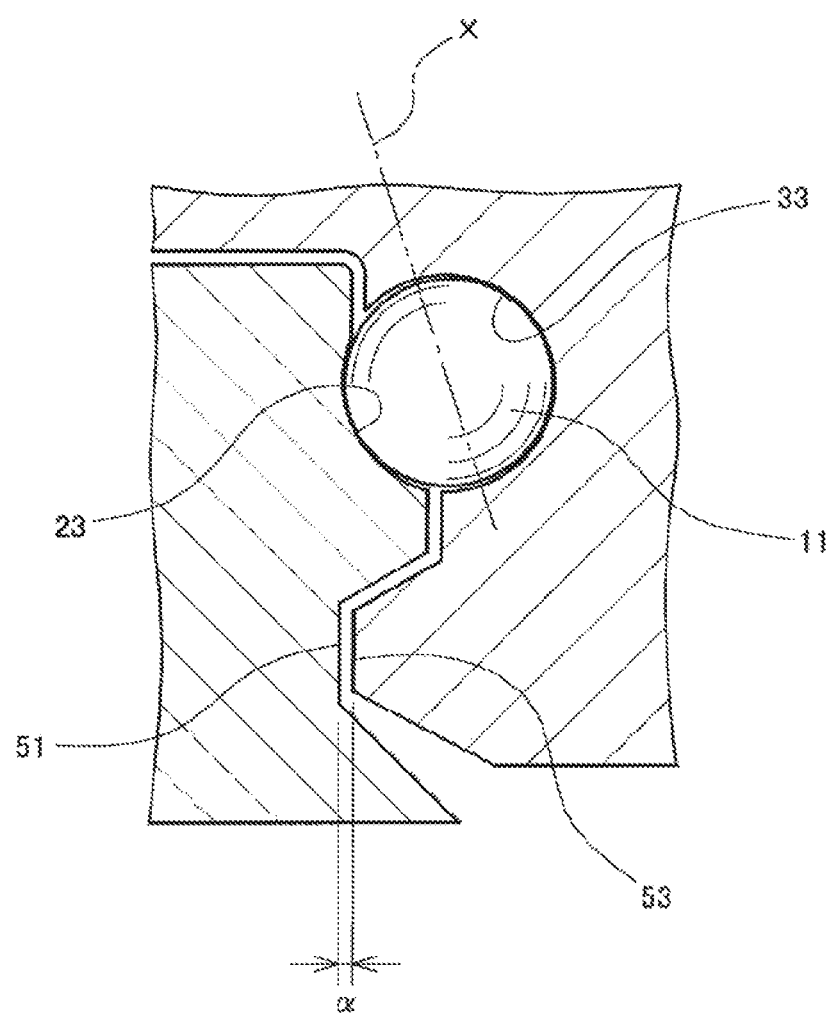
FIG. 2 is an enlarged view of part of FIG. 1 in accordance with an embodiment of the present invention.
Figure 3:
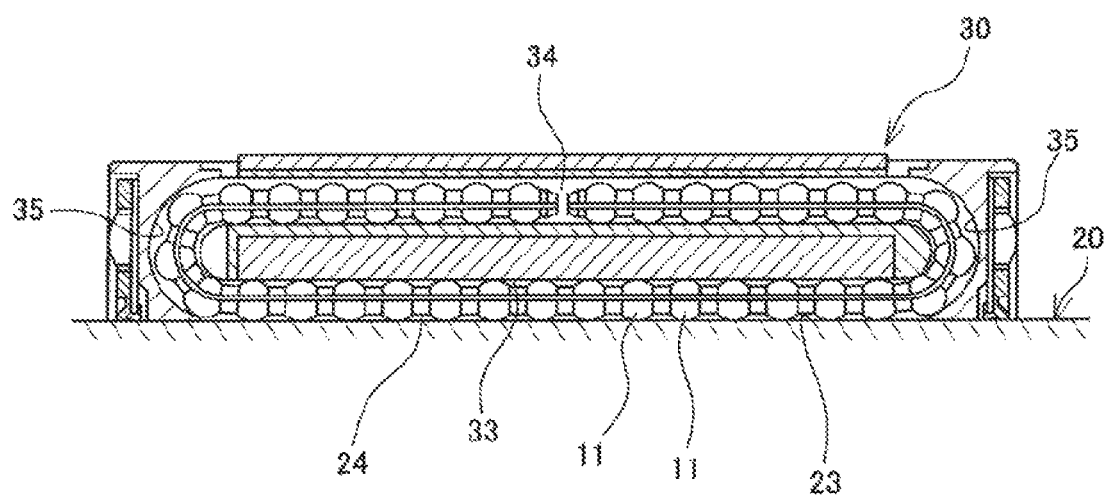
FIG. 3 is a schematic profile view illustrating an example of an endless circulation passage provided to the motion guide device according to the embodiment.

A motion guide device 10 according to the embodiment will be described with reference to FIGS. 1 to 3. FIG. 1 is a frontal cross-sectional view of a track rail and a movable block provided to a motion guide device according to the embodiment. FIG. 2 is an enlarged view of part of FIG. 1. FIG. 3 is a schematic profile view illustrating an example of an endless circulation passage provided to the motion guide device according to the embodiment.

As illustrated in FIG. 1, the motion guide device 10 according to the embodiment is provided with a track rail 20, serving as a track member, and with a movable block 30, serving as a moving member, that is assembled to the track rail 20 with via a plurality of balls 11, serving as rolling members, so as to be capable of linear motion.

The track rail 20 is a member that is formed elongated in a longitudinal direction. The upper and lower surfaces of the track rail 20 are configured as horizontal surfaces as seen in a vertical cross-section. The left and right surfaces of the track rail 20 have projecting and recessed shapes. Ball rolling grooves 23, serving as rolling member rolling surfaces, are formed in the surface of the track rail 20. The ball rolling grooves 23 extend in the longitudinal direction of the track rail 20. In the embodiment, one ball rolling groove 23 is formed in each left and right side of the track rail 20, with two ball rolling grooves 23 being formed in total.

The cross-sectional shape of each ball rolling groove 23 is formed as circular arc groove made of a single circular arc. The radius of curvature of the ball rolling grooves 23 is slightly larger than the radius of the balls 11, and the balls 11 make point contact with the ball rolling grooves 23.

As illustrated in FIGS. 1 and 2, the track rail 20 is formed with recesses 51 in the longitudinal direction. The recesses 51 according to the embodiment are formed with substantially trapezoidal shapes in cross-section, and are formed at the lower side of the ball rolling grooves 23 in a state in which the track rail 20 has been disposed on a horizontal surface.

The movable block 30 is provided with a central portion 31 that opposes the upper surface of the track rail 20, and with a pair of sidewalls 32 that respectively extend downward from the left and right sides of the central portion 31 and oppose the left and right surfaces of the track rail 20 in a state in which the track rail 20 has been disposed on a horizontal surface. The movable block 30 is formed with an overall saddle shape.

Loaded ball rolling grooves 33, serving as loaded rolling member rolling surfaces, are provided in the movable block 30. The loaded ball rolling grooves 33 oppose the ball rolling grooves 23 in the track rail 20. The cross-sectional shape of each loaded ball rolling groove 33 is formed as a circular arc groove made of a single circular arc, similarly to the ball rolling grooves 23. The radius of curvature of the loaded ball rolling grooves 33 is slightly larger than the radius of the balls 11, and the balls 11 make point contact with the loaded ball rolling grooves 33.

As illustrated in FIG. 2, in the embodiment, the loaded ball rolling grooves 33 are configured as shapes that fit around and hold the balls 11. More specifically, when a line in a direction perpendicular to a line connecting the points at which the balls 11 contact the ball rolling grooves 23 and the loaded ball rolling grooves 33 is defined to be a virtual line X, the loaded ball rolling grooves 33 are configured such that portions of the loaded ball rolling grooves 33 past the virtual line X fit around and hold the balls 11. That is, ends of the loaded ball rolling grooves 33 past the virtual line X are formed becoming narrower such that the balls 11 do not fall. Configuration is thus such that even if the movable block 30 were removed from the track rail 20, the balls 11 would not fall from the movable block 30.

As illustrated in FIG. 3, loaded ball rolling passages 24 are formed by the ball rolling grooves 23 in the track rail 20 and the loaded ball rolling grooves 33, and ball return passages 34, serving as rolling member return passages, are formed extending parallel to the direction in which the loaded ball rolling passages 24 extend. Turnabout passages 35 that connect the loaded ball rolling passages 24 and the ball return passages 34 are also formed. Endless circulation passages are formed by the loaded ball rolling passages 24, the ball return passages 34, and the pair of turnabout passages 35.

When the movable block 30 is moved relative to the track rail 20, the plurality of balls 11 move in a rolling manner while bearing load in the loaded ball rolling passages 24. Balls 11 that have rolled to one end of a loaded ball rolling passage 24 enter the respective ball return passages 34 after having gone through one of the pair of turnabout passages 35. Balls 11 that have passed through the ball return passage 34 re-enter the respective loaded ball rolling passages 24 after having gone through the other of the pair of turnabout passages 35.

The movable block 30 is formed with holding protrusions 53 that correspond to the recesses 51 in the track rail 20. In the embodiment, the holding protrusions 53 are formed with substantially trapezoidal shapes corresponding to the shapes of the recesses 51 in the track rail 20, and are formed at the lower side of the loaded ball rolling grooves 33 in a state in which the track rail 20 has been disposed on a horizontal surface. As illustrated in FIG. 2, a gap $\alpha$ is formed between the recesses 51 and the holding protrusions 53.

In the motion guide device 10 according to the embodiment, when an external load (reverse radial load) of at least a certain value is applied in a direction that would cause relative separation of the movable block 30 and the track rail 20, the contact points between the balls 11 and the ball rolling grooves 23 and the loaded ball rolling grooves 33 change, and the recesses 51 and the holding protrusions 53 come into contact. The holding protrusions 53 and the recesses 51 bear the external load (reverse radial load) due to the recesses 51 and the holding protrusions 53 coming into contact and the holding protrusions 53 holding onto the recesses 51. With this configuration, the track rail 20 and the movable block 30 of the motion guide device 10 according to the embodiment are unable to be separated.

After the holding protrusions 53 and the recesses 51 have taken the external load, when the external load (reverse radial load) in a direction that would cause relative separation of the movable block 30 and the track rail 20 is lifted, the contact points between the balls 11 and the ball rolling grooves 23 and the loaded ball rolling grooves 33 revert back to that before the change, contact between the recesses 51 and the holding protrusions 53 is broken, and the gap α is formed.

Here, it is preferable that the gap α be formed having a width suited to the change in the contact points between the balls 11 and the ball rolling grooves 23 and the loaded ball rolling grooves 33. To explain in more detail, first, it is necessary that the gap α be of a dimension such that reciprocating movement of the movable block 30 relative to the track rail 20 is carried out smoothly when external load (reverse radial load) in a direction that would cause relative separation of the movable block 30 and the track rail 20 is not being applied. Further, it is necessary that the gap α be of a dimension such that the gap α is maintained within a range where the balls 11 do not fall from the ball rolling grooves 23, and reciprocating movement of the movable block 30 relative to the track rail 20 is carried out smoothly, even in cases in which a change in the contact points between the balls 11 and the ball rolling grooves 23 and the loaded ball rolling grooves 33 arises due to the application of external load (reverse radial load) in a direction that would cause relative separation of the movable block 30 and the track rail 20. Moreover, it is necessary that the gap α becomes zero and the holding protrusions 53 and the recesses 51 take external load at least immediately prior to the adoption of a state in which there will be a large change in the contact points between the balls 11 and the ball rolling grooves 23 and the loaded ball rolling grooves 33 and the balls 11 are to fall from the ball rolling grooves 23. Setting the gap α such that these conditions are satisfied makes it possible to realize the motion guide device 10 according to the embodiment, in which the track rail 20 and the movable block 30 are unable to be separated, while still maintaining fundamental motion guide device guiding functionality.

Note that in the motion guide device 10 according to the embodiment, since the ball rolling grooves 23 and the loaded ball rolling grooves 33 are formed as circular arc grooves, configuration is such that the changing of contact points described above is carried out smoothly, and the making and breaking of contact between the recesses 51 and the holding protrusions 53 is carried out smoothly.

Figure 4:
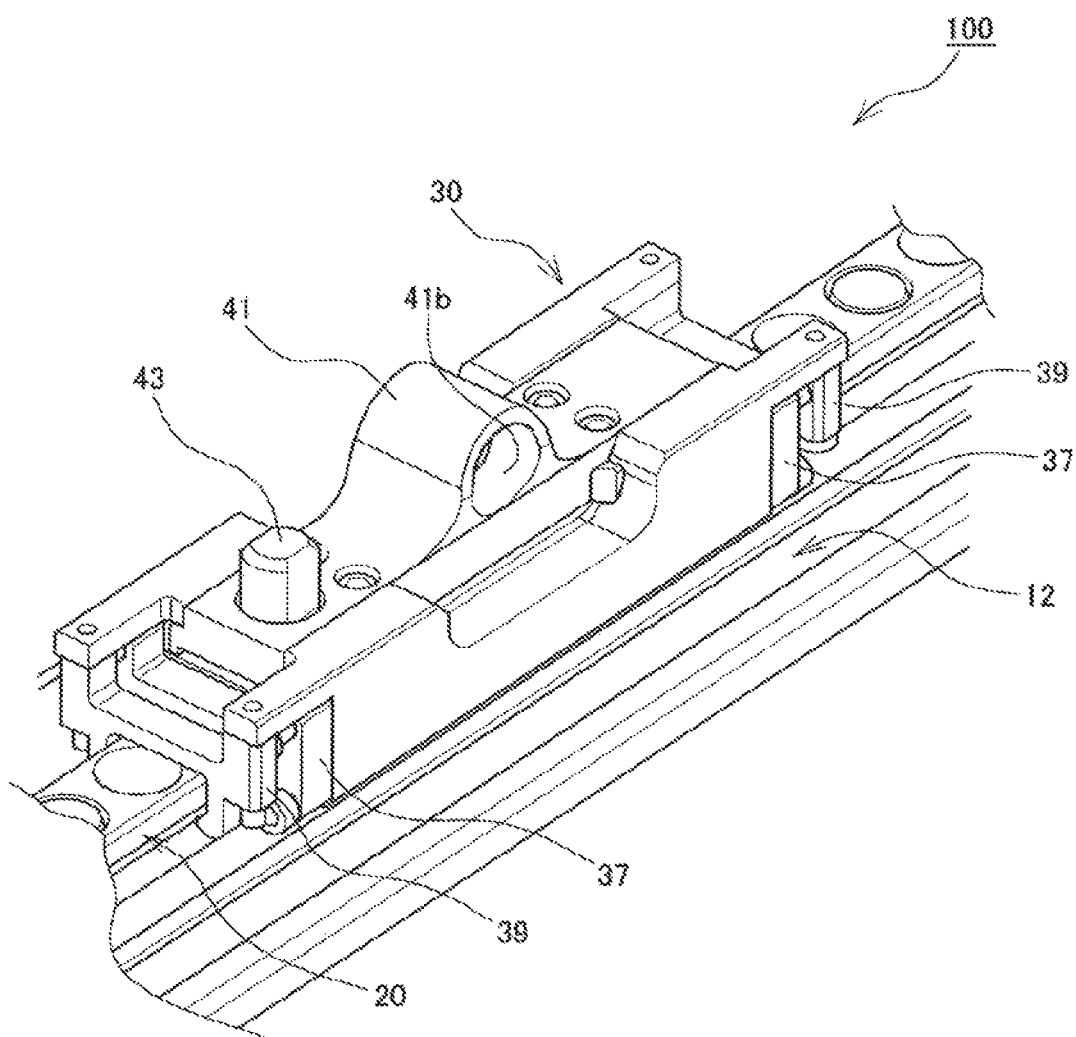
FIG. 4 is an external perspective view illustrating a motion guide device according to an example.
Figure 5:
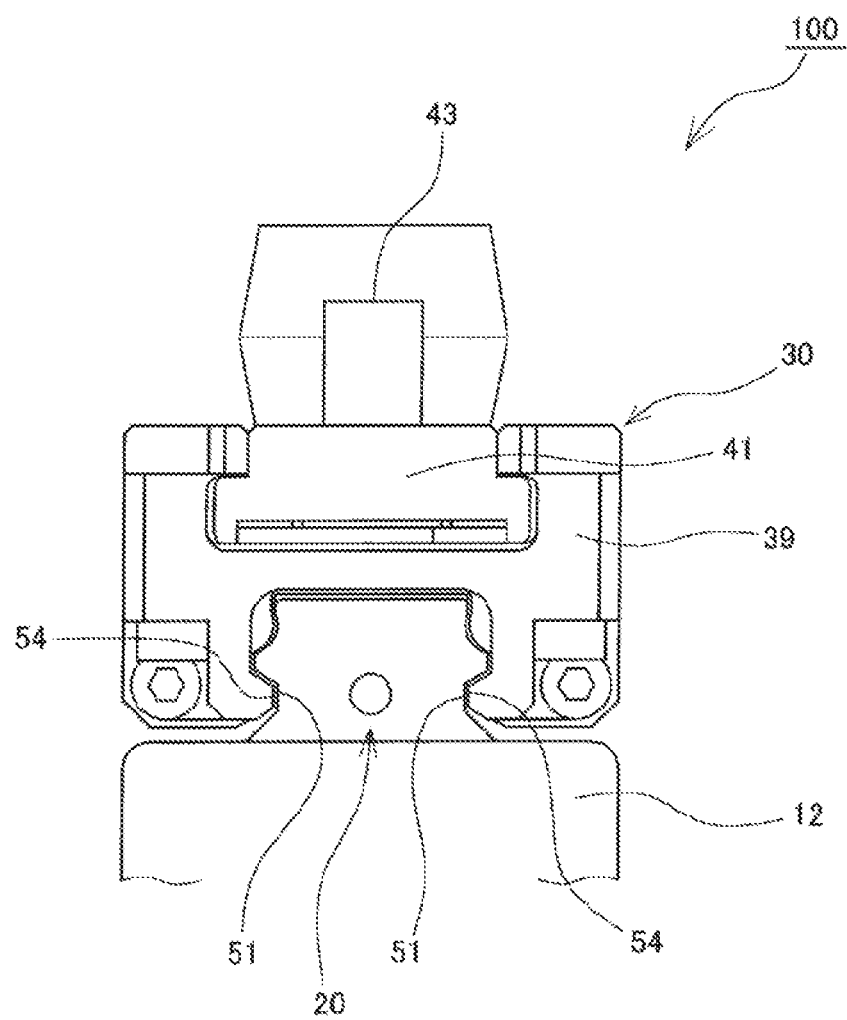
FIG. 5 is a frontal view illustrating the motion guide device according to the example.
Figure 6:
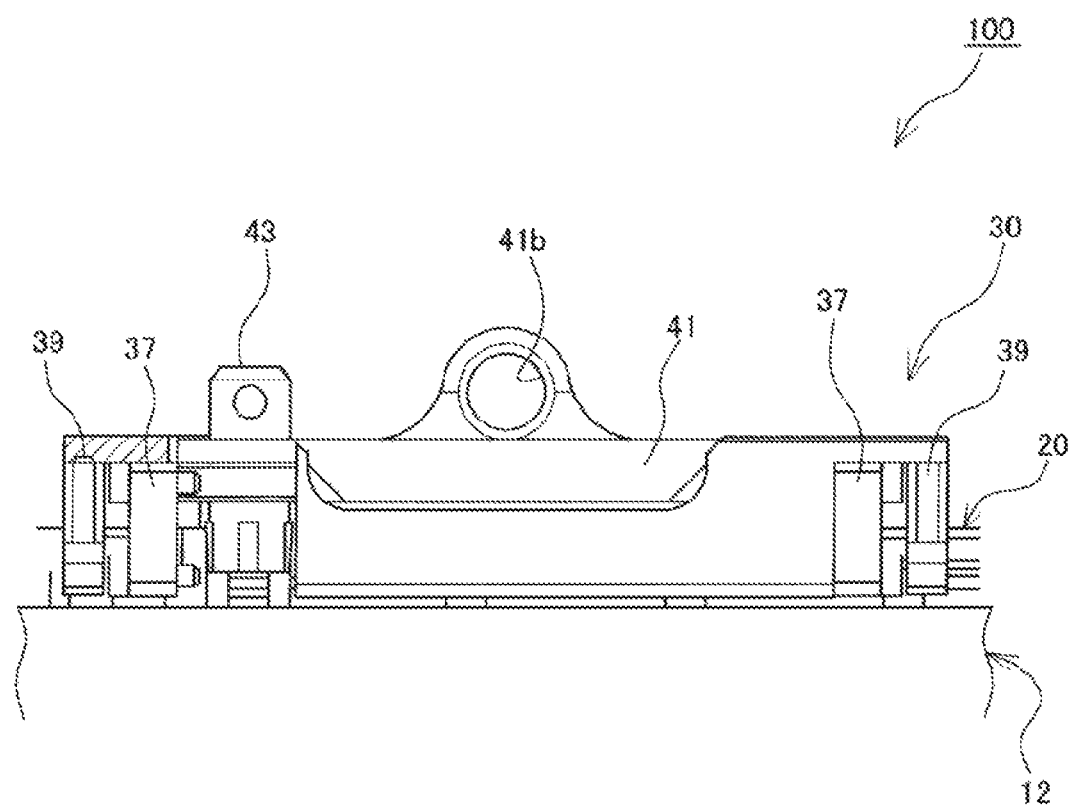
FIG. 6 is a side view illustrating the motion guide device according to the example.
Figure 7:
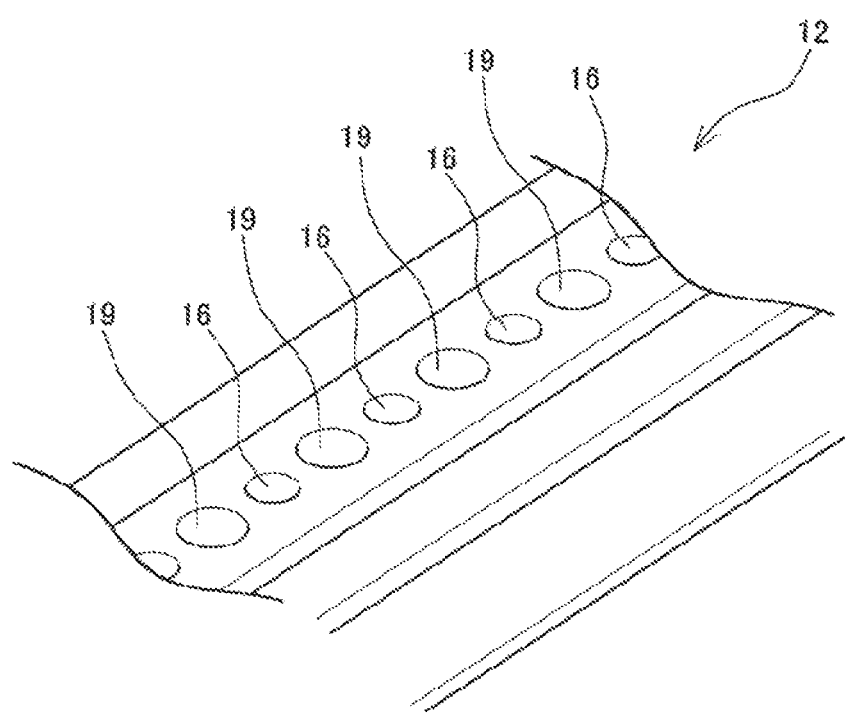
FIG. 7 is an external perspective view illustrating a base member according to the example.
Figure 8:
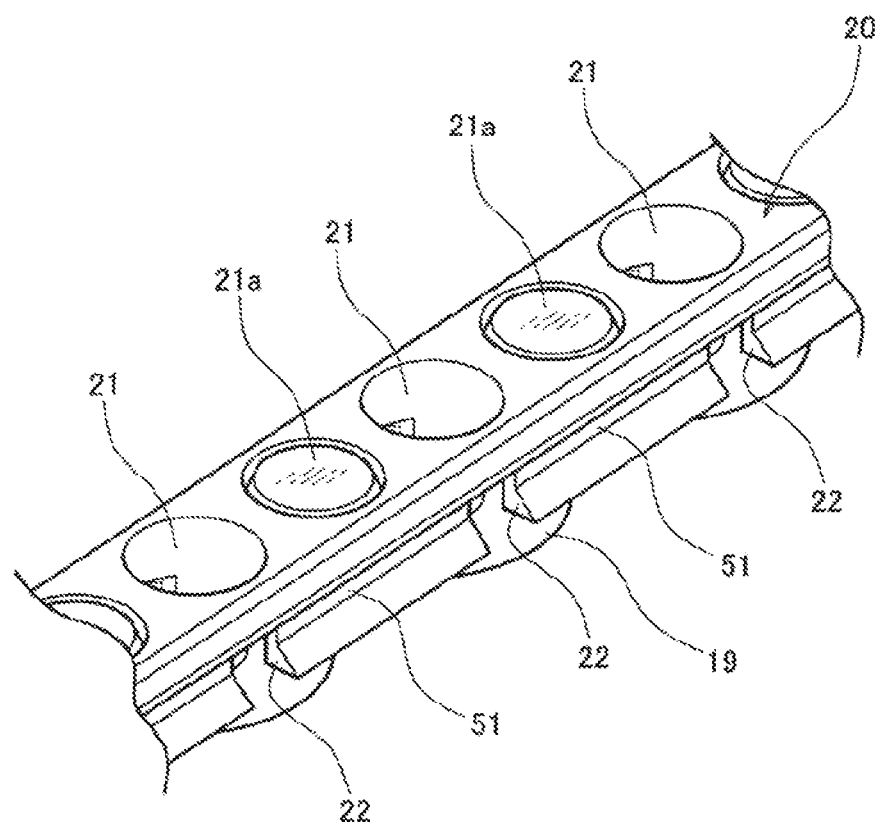
FIG. 8 is a diagram illustrating a track rail according to the example.
Figure 9:
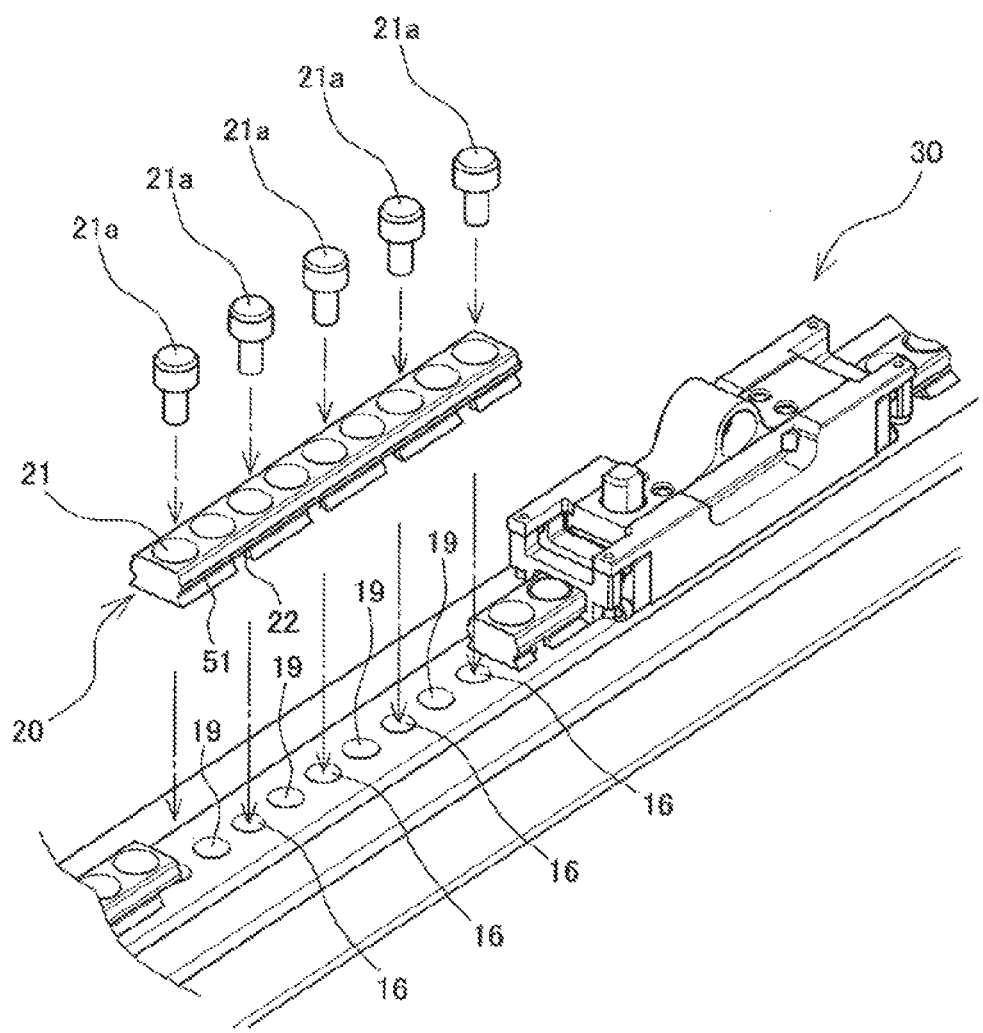
FIG. 9 is a diagram for explaining a method of securing the track rail to the base member according to the example.
Figure 10:
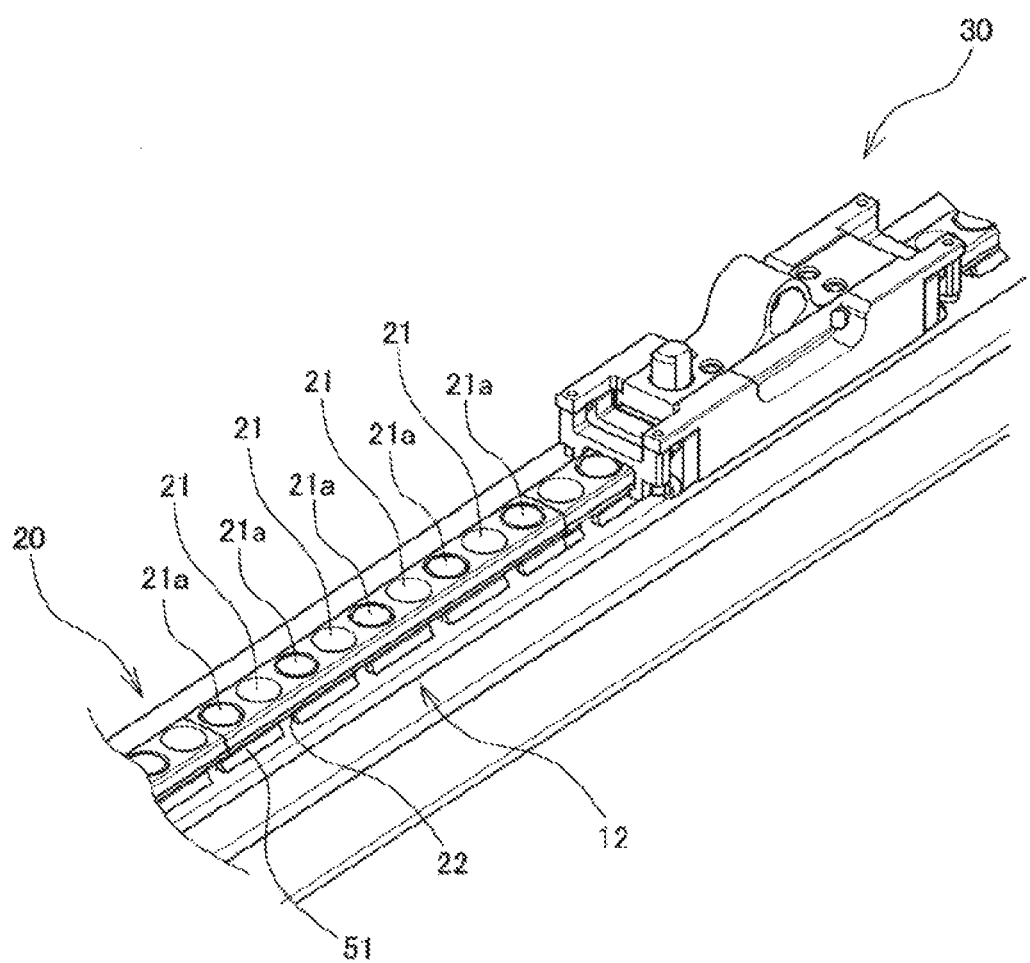
FIG. 10 is an external perspective view illustrating a state in which the track rail has been secured to the base member according to the example.
Figure 11:
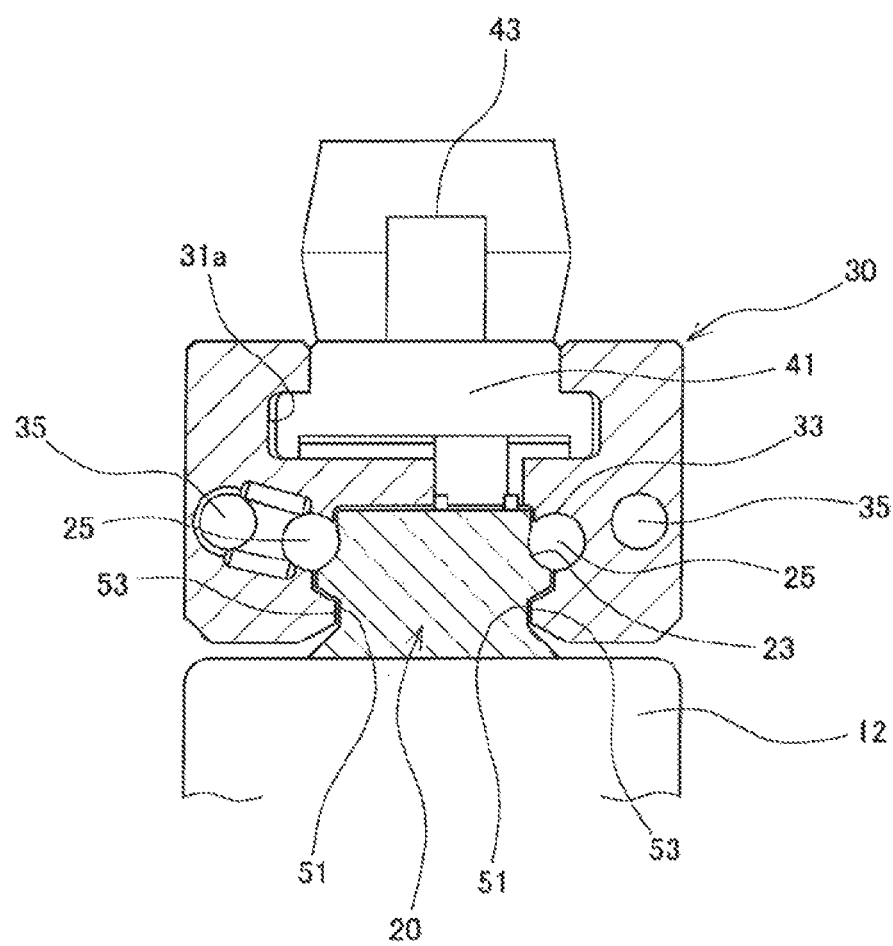
FIG. 11 is a frontal cross-sectional view illustrating the track rail and the movable block provided to the motion guide device according to the example.
Figure 12:
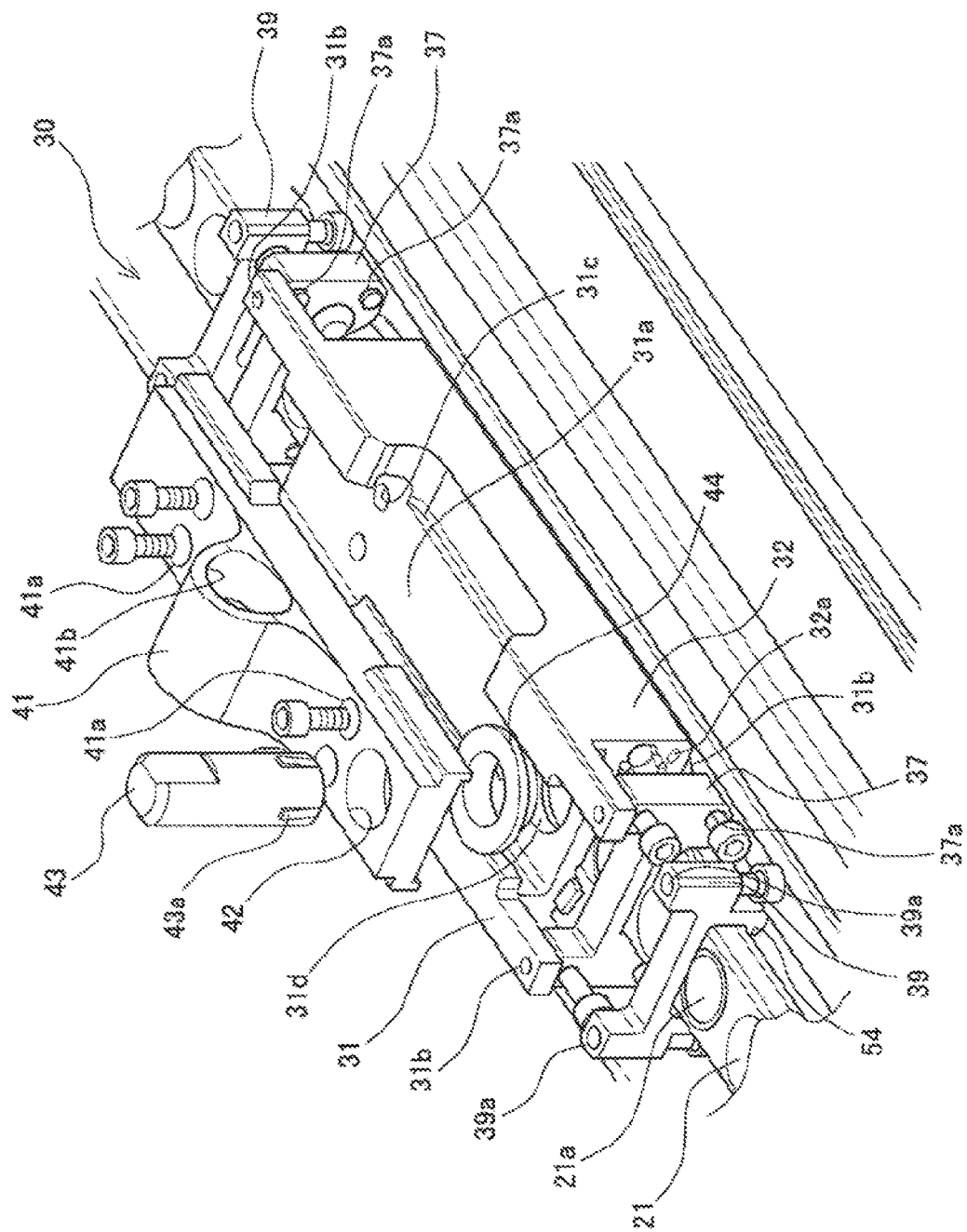
FIG. 12 is an exploded view of the movable block according to the example.
Figure 13:
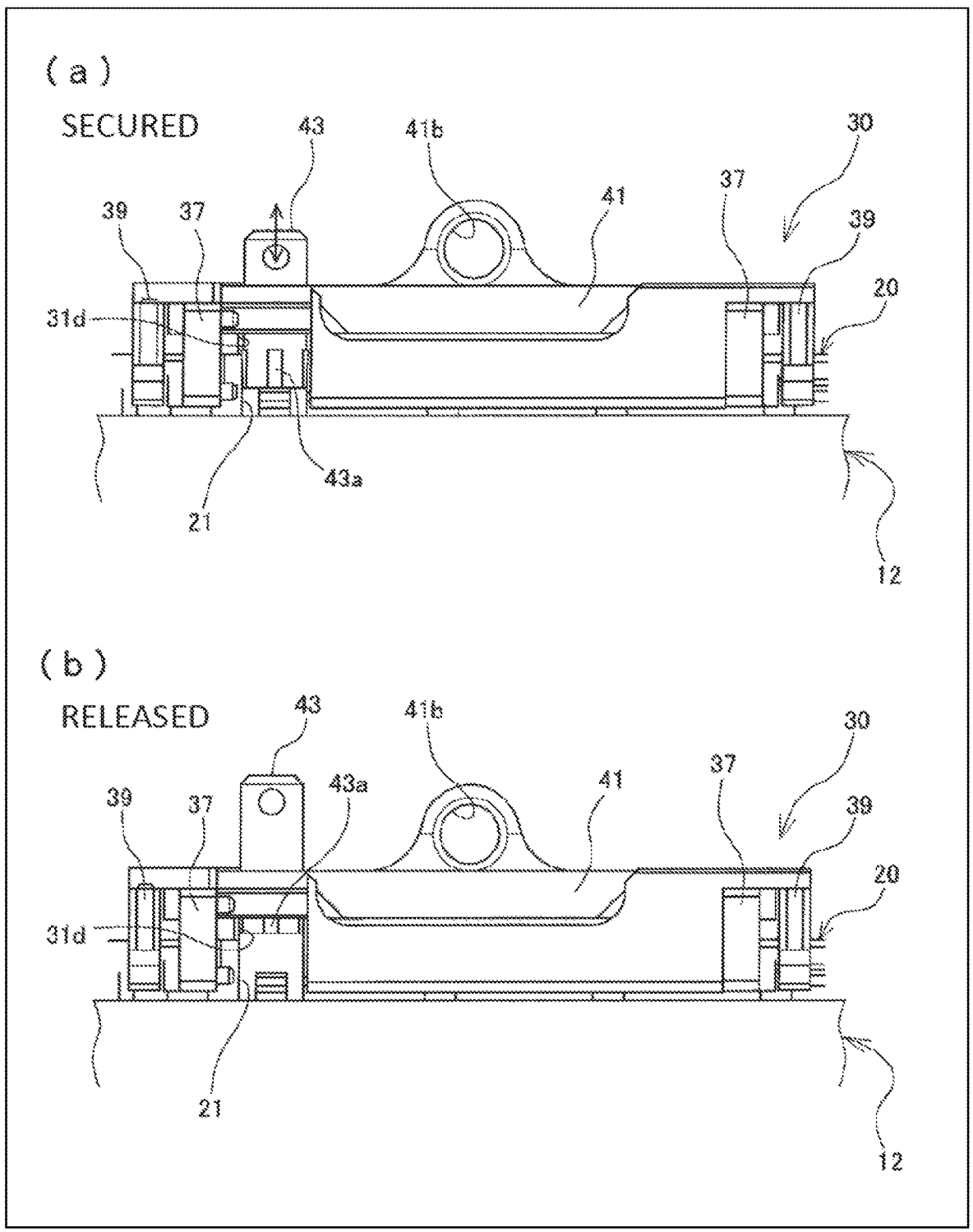
FIG. 13 is a diagram for explaining a method of securing/releasing the movable block using a brake pin according to the example.

The basic configuration of the motion guide device 10 according to the embodiment has been described in the foregoing. Next, a motion guide device 100 according to an example will be described with reference to FIGS. 4 to 13. This example is a specific example application of the motion guide device 10 according to the embodiment. FIG. 4 is an external perspective view illustrating the motion guide device according to the example. FIG. 5 is a frontal view illustrating the motion guide device according to the example. FIG. 6 is a side view illustrating the motion guide device according to the example. FIG. 7 is an external perspective view illustrating a base member according to the example. FIG. 8 is a diagram illustrating a track rail according to the example. FIG. 9 is a diagram for explaining a method of securing the track rail to the base member according to the example. FIG. 10 is an external perspective view illustrating a state in which the track rail has been secured to the base member according to the example. FIG. 11 is a frontal cross-sectional view illustrating the track rail and the movable block provided to the motion guide device according to the example. FIG. 12 is an exploded view of the movable block according to the example. FIG. 13 is a diagram for explaining a method of securing/releasing the movable block using a brake pin according to the example. FIG. 13(a) is a diagram illustrating a state in which the movable block has been secured, and FIG. 13(b) illustrates a state in which the movable block has been released. Note that configuration that is identical or similar to that in the embodiment described above is denoted using identical reference numerals, and explanation thereof is sometimes omitted.

[Motion Guide Device 100 According to an Example]

As illustrated in FIGS. 4 to 6, the motion guide device 100 according to the example is provided with a base member 12, which serves as a base, a track rail 20 serving as a track member, and a movable block 30 that is attached to the track rail 20 via a plurality of balls 11 so as to be capable of linear movement.

As illustrated in FIG. 7, the base member 12 is formed with securing holes 16 for securing the track rail 20 to the base member 12, and with insertion holes 19 into which a brake pin 43, described below, can be inserted. A plurality of each of the securing holes 16 and the insertion holes 19 are alternatingly formed in the longitudinal direction of the base member 12.

As illustrated in FIGS. 8 to 10, similarly to in the embodiment described above, the track rail 20 is formed with recesses 51 in the longitudinal direction. The recesses 51 according to the example are formed with substantially trapezoidal shapes in cross-section, and are formed at the lower side of the ball rolling grooves 23 in a state in which the track rail 20 has been disposed on the base member 12. As illustrated in FIG. 8, the track rail 20 is formed with securing holes 21 for securing the track rail 20 to the base member 12. The securing holes 21 are not only for securing the track rail 20 to the base member 12, but function as a securing means into which a brake pin 43, described below, is inserted for placing the movable block 30 into a secured state. The cross-sectional shape of each ball rolling groove 23 in the track rail 20 is formed as a circular arc groove made of a single circular arc.

As illustrated in FIG. 8, the sides of the track rail 20 according to the example are formed having cutout portions 22 at locations where the securing holes 21 are formed. Due to having these cutout portions 22, in the example, configuration is such that in cases in which dirt or the like has entered into the securing holes 21, this dirt or the like is able to be discharged from the cutout portions 22. Thus, in the motion guide device 100 according to the example, smooth relative movement of the movable block 30 with respect to the track rail 20 is maintained without being affected by dirt or the like.

As illustrated in FIG. 9, bolts 21a are inserted in the securing holes 21 formed in the track rail 20 and the securing holes 16 formed in the base member 12 and the bolts are fastened, whereby the track rail 20 is securely installed to the base member 12 as illustrated in FIG. 10.

As illustrated in FIGS. 4 to 6, the movable block 30 is provided with a pair of end plates 37, serving as caps, with cover plates 39, serving as cap members, provided at both the front and rear ends of the movable block 30 in the direction of movement, with an adapter plate 41 for joining another member and the movable block 30 together, and with a brake pin 43 for securing and releasing the movable block 30.

As illustrated in FIG. 12, the movable block 30 according to the example, at a central portion 31 that opposes the upper surface of the track rail 20 in a state in which the track rail 20 has been disposed on the base member 12, is formed with an adapter plate installation portion 31a for installing the adapter plate 41. As illustrated in FIG. 11, the adapter plate installation portion 31a is a location that is formed as a substantially inverted-T shaped grooved part as viewed in a vertical cross-section. The adapter plate 41 has a substantially inverted-T shape outer shape as viewed in a vertical cross-section corresponding to the shape of the substantially inverted-T shaped adapter plate installation portion 31a as viewed in a vertical cross-section. Thus, so that the substantially inverted-T shaped outer shape of the adapter plate 41 fits into the substantially inverted-T shaped grooved part of the adapter plate installation portion 31a, the adapter plate 41 is inserted into the adapter plate installation portion 31a while being slid in the longitudinal direction, that is, from the upper right of the page to the lower left of the page in FIG. 12. This makes it possible to install the adapter plate 41 in the adapter plate installation portion 31a. An adapter plate 41 inserted in the adapter plate installation portion 31a cannot easily be separated from the adapter plate installation portion 31a due to the effect of the substantially inverted-T shaped grooved part and outer shape. Thus, even in the unlikely event that a bolt (described in detail below) that securely connects the adapter plate installation portion 31a and the adapter plate 41 together were to come out, since the adapter plate installation portion 31a and the adapter plate 41 do not easily separate, the motion guide device 100 according to the example has an extremely safe device configuration. As described above, the movable block 30 according to the example is provided with the adapter plate 41 for attaching an external member and with the adapter plate installation portion 31a for installing the adapter plate 41, and the adapter plate installation portion 31a has a grooved part, and the adapter plate 41 has an outer shape similar to that of the grooved part, whereby configuration is such that the adapter plate 41 is able to slidingly inserted into the adapter plate installation portion 31a. However, configuration may be such that a grooved part is formed in the adapter plate 41, and the adapter plate installation portion 31a is formed having an outer shape similar to that of the grooved part.

As illustrated in FIG. 12, the sidewalls 32 of the movable block 30 are formed with securing holes 32a for securing the end plates 37 to the movable block 30. The central portion 31 of the movable block 30 is formed with securing holes 31b for securing the cover plates 39, with securing holes 31c for securing the adapter plate 41, and with an insertion hole 31d for inserting the brake pin 43.

As illustrated in FIG. 11, similarly to in the embodiment described above, the movable block 30 is formed with holding protrusions 53 that correspond to the recesses 51 in the track rail 20. In the example, the holding protrusions 53 are formed with substantially trapezoidal shapes corresponding to the shapes of the recesses 51 in the track rail 20, and are formed at the lower side of the loaded ball rolling grooves 33 in a state in which the track rail 20 has been disposed on the base member 12. A gap α is formed between the recesses 51 in the track rail 20 and the holding protrusions 53 of the movable block 30 (see FIG. 2). Note that similarly to in the embodiment described above, the gap α is formed having a width suited to the change in the contact points between the balls 11 and the ball rolling grooves 23 and the loaded ball rolling grooves 33. Similarly to the ball rolling grooves 23, the cross-sectional shape of each loaded ball rolling groove 33 in the movable block 30 is formed as a circular arc groove made of a single circular arc.

When an external load (reverse radial load) of at least a certain value is applied to the movable block 30 in a direction that would cause relative separation from the track rail 20, in the motion guide device 100 according to the example, the contact points between the balls 11 and the ball rolling grooves 23 and the loaded ball rolling grooves 33 change, and the recesses 51 and the holding protrusions 53 come into contact. Configuration is such that the holding protrusions 53 and the recesses 51 bear the external load (reverse radial load) due to the recesses 51 and the holding protrusions 53 coming into contact and the holding protrusions 53 holding onto the recesses 51. With this configuration, the track rail 20 and the movable block 30 of the motion guide device 100 according to the example are unable to be separated. After the holding protrusions 53 and the recesses 51 have taken the external load, when the effect of the external load (reverse radial load) is lifted, the contact points between the balls 11 and the ball rolling grooves 23 and the loaded ball rolling grooves 33 revert back to that before the change, contact between the recesses 51 and the holding protrusions 53 is broken such that a gap α is formed, and the initial state of the motion guide device 100 according to the example is restored.

In the motion guide device 100 according to the example, since the ball rolling grooves 23 and the loaded ball rolling grooves 33 are formed as circular arc grooves, configuration is such that the changing of contact points described above is carried out smoothly, and the making and breaking of contact between the recesses 51 and the holding protrusions 53 is carried out smoothly.

As illustrated in FIG. 12, the end plates 37 are formed having securing holes 37a for securing the end plates 37 to the movable block 30. The pair of end plates 37 are installed to both the front and rear sides of the movable block 30 in the direction of movement by inserting bolts in the securing holes 37a and the securing holes 32a formed in the sidewalls 32 of the movable block 30 for securing the end plates 37 to the movable block 30 and fastening the bolts. The insides of the end plates 37 are formed with turnabout passages 35 that configure the endless circulation passage described above. Note that the end plates 37 according to the example are substantially rectangular as viewed face on.

As illustrated in FIG. 5, so as to cover the track rail 20, the cover plates 39 are members formed in substantially an H-shape as viewed face on. Further, as illustrated in FIG. 12, the cover plates 39 are formed having securing holes 39a for securing the cover plates 39 to the movable block 30. The cover plates 39 are installed to both the front and rear ends of the movable block 30 in the direction of movement by inserting bolts in the securing holes 39a and the securing holes 31b formed in the central portion 31 of the movable block 30 for securing the cover plates 39 to the movable block 30 and fastening the bolts. As illustrated in FIG. 5, the cover plates 39 are formed with cover plate holding protrusions 54, serving as cap member holding protrusions, that correspond to the recesses 51 in the track rail 20. In the example, the cover plate holding protrusions 54 are formed at the lower end of the cover plates 39, with substantially trapezoidal shapes corresponding to the shape of the recesses 51 in the track rail 20, in a state in which the track rail 20 has been disposed on the base member 12. The cover plates 39 prevent the end plates 37 from striking the track rail 20 when the movable block 30 is installed to the track rail 20, and also exhibit functionality for guiding the installation of the movable block 30.

The adapter plate 41 is provided with securing holes 41a corresponding to the securing holes 31c formed in the central portion 31 of the movable block 30, with an attachment hole 41b for attaching an external member, and with an insertion hole 42 for inserting the brake pin 43. As illustrated in FIGS. 11 and 12, in a state in which the adapter plate 41 has been slidingly inserted into the adapter plate installation portion 31a, the adapter plate 41 is securely installed to the adapter plate installation portion 31a of the movable block 30 by inserting bolts into the securing holes 31c formed in the central portion 31 of the movable block 30 and the securing holes 41a formed in the adapter plate 41 and fastening the bolts. The brake pin 43 is inserted in the insertion hole 42 in the adapter plate 41 with a bushing 44 made of resin being interposed therebetween.

As illustrated in FIGS. 12 and 13(a), the brake pin 43 is inserted in the insertion hole 42 in the adapter plate 41, the insertion hole 31d in the movable block 30, and a securing hole 21 in the track rail 20 so as to secure the movable block 30 to the track rail 20. Note that in addition to the insertion hole 42 in the adapter plate 41, the insertion hole 31d in the movable block 30, and a securing hole 21 in the track rail 20, the brake pin 43 may be inserted as far as an insertion hole 19 formed in the base member 12. As illustrated in FIG. 13(b), when the brake pin 43 is lifted up from the secured state illustrated in FIG. 13(a) and the brake pin 43 is removed from a securing hole 21 formed in the track rail 20, the secured state of movable block 30 with respect to the track rail 20 is released, allowing the movable block 30 to move relative to the track rail 20. In the example, since the brake pin 43 is inserted in the insertion holes 42, 31d with the bushing 44 made of resin being interposed therebetween, the brake pin 43 is able to move up and down smoothly, and an action to secure/release the movable block 30 to/from the track rail 20 is able to be smoothly performed.

Tapered protrusions 43a with tapered shapes are formed to the brake pin 43 in the area around the lower side leading end of the brake pin 43. In addition to functioning as guides when the brake pin 43 is inserted into the insertion holes 42, 31d, these tapered protrusions 43a are configured so as to also exhibit functionality as brakes for ensuring that the brake pin 43 does not easily come out from the insertion holes 42, 31d. Note that in order to ensure that the brake pin 43 can be smoothly inserted into the insertion hole 42, it is preferable to adopt configuration in which the area around the entrance of the insertion hole 42 is beveled.

Due to the motion guide device 100 according to the example having the above configuration, in addition to it being possible to secure the movable block 30 to a desired position on the track rail 20, this securing can be released such that the movable block 30 can be moved relative to the track rail 20.

Figure 14:
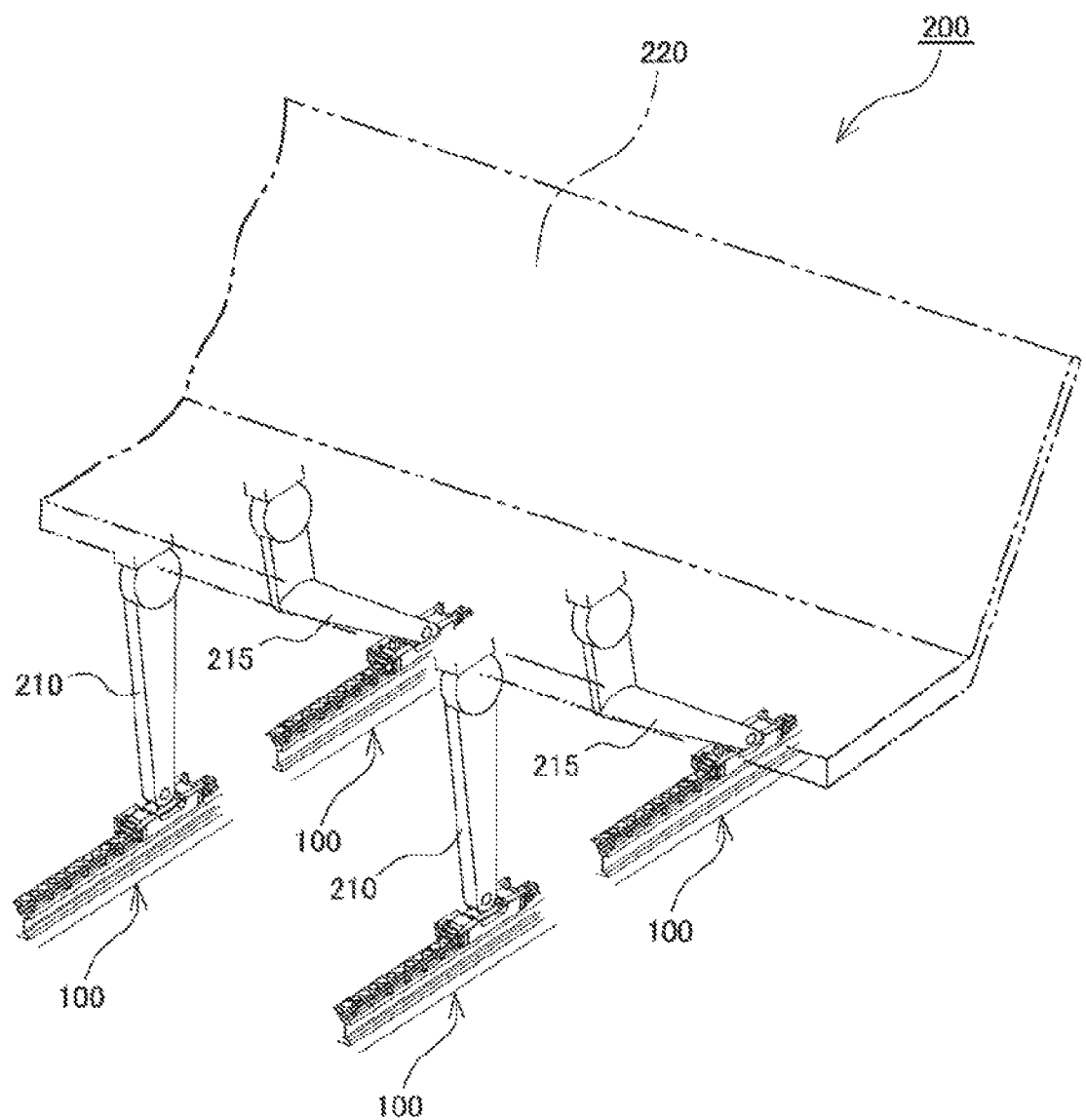
FIG. 14 is an external perspective view illustrating a seating apparatus to which motion guide devices according to the example have been applied.
Figure 15:
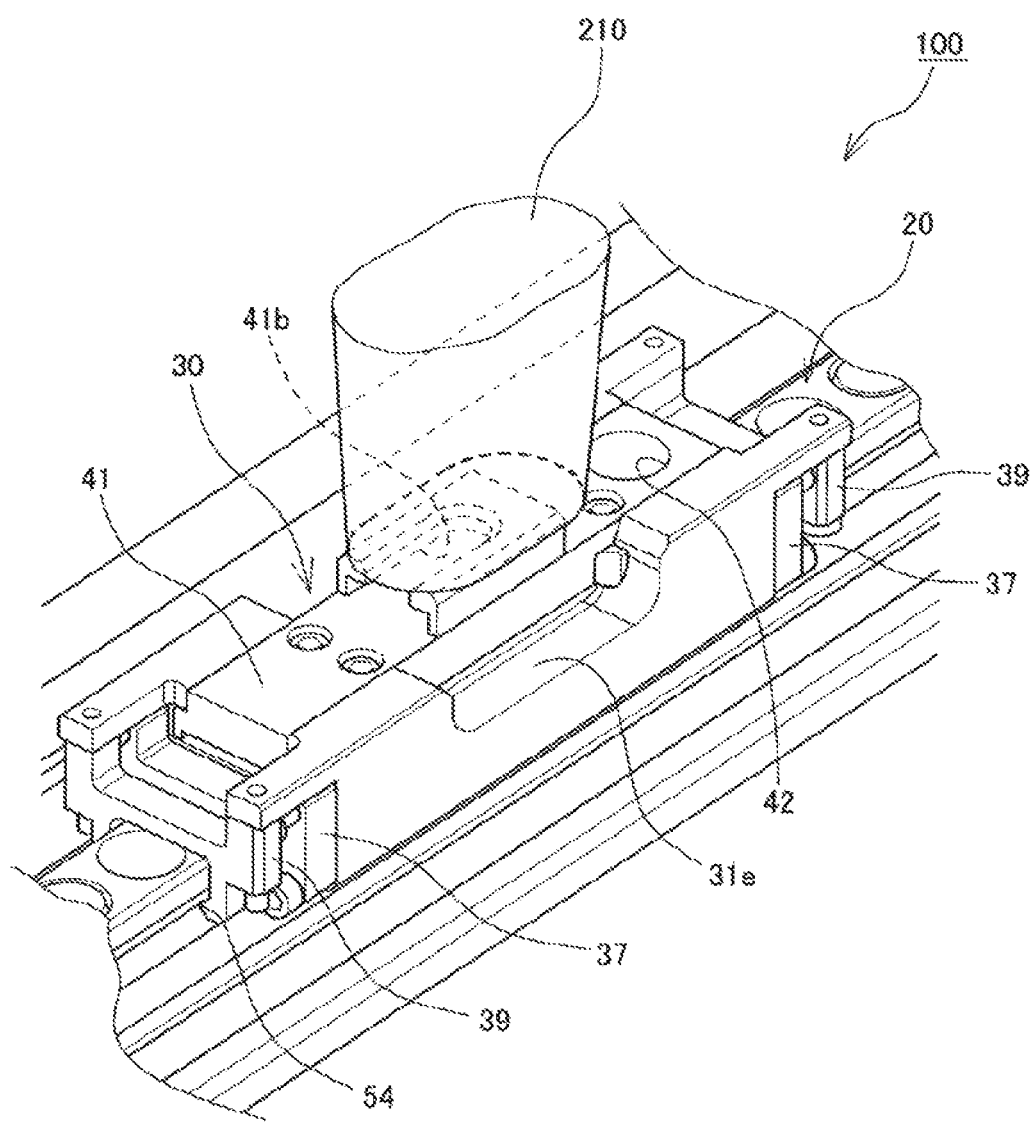
FIG. 15 is an enlarged view of a motion guide device and a front leg portion of the seating apparatus illustrated in FIG. 14 in accordance with an embodiment of the present invention.
Figure 16:
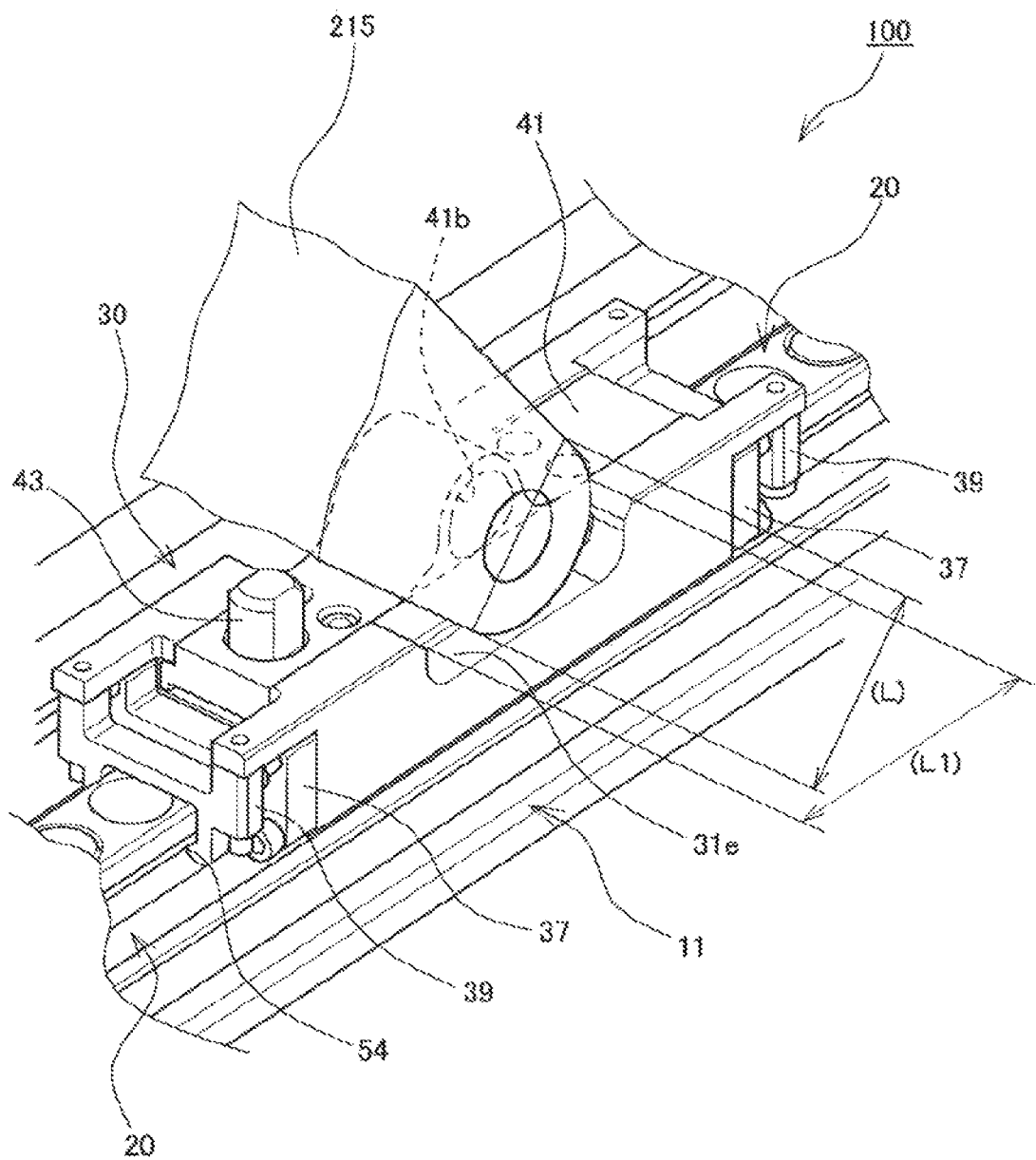
FIG. 16 is an enlarged view of a motion guide device and a rear leg portion of the seating apparatus illustrated in FIG. 14 in accordance with an embodiment of the present invention.

A specific device configuration of the motion guide device 100 according to the example has been described in the foregoing. Next, an example application of the motion guide device 100 according to the example will be described with reference to FIGS. 14 to 16. FIG. 14 is an external perspective view illustrating a seating apparatus to which motion guide devices according to the example have been applied. FIG. 15 is an enlarged view of a motion guide device and a front leg portion of the seating apparatus illustrated in FIG. 14. FIG. 16 is an enlarged view of a motion guide device and a rear leg portion of the seating apparatus illustrated in FIG. 14.

[Example Application of the Motion Guide Device 100 According to the Example]

As illustrated in FIG. 14, motion guide devices 100 according to the example can, for example, be applied to an aircraft seating apparatus 200.

As illustrated in FIG. 14, the seating apparatus 200 is configured including legs 210, 215, and a seat section 220. As illustrated in FIGS. 15 and 16, the legs 210, 215 are each joined to an adapter plate 41 installed to the movable block 30 of a motion guide device 100. Note that this joining is made possible using the attachment holes 41b formed in the adapter plates 41. So that external members (legs 210, 215) of various shapes can be attached to the adapter plates 41, the central portion 31 of each movable block 30 configuring a motion guide device 100 according to the example is provided with relief portions 31e formed by making cutouts in the upper sides of both sidewalls of the central portion 31 such that open space is formed around the attachment holes 41b, whereby it becomes possible to tilt the external members (legs 210, 215). The relief portions 31e are each formed by a centrally-positioned straight portion and two curved portions positioned on either side of the straight portion. The relief portions 31e are shaped such that, for example, even in cases in which the legs 210, 215 of the aircraft seating apparatus 200 are of a type able to be folded, the relief portions 31e do not obstruct the tilting action of the legs 210, 215. Note that the relief portions 31e according to the example are each formed by a centrally-positioned straight portion and two curved portions positioned on either side of the straight portion, and adopt the shape of a substantially ellipsoid form divided in half. However, any shape may be adopted as the shape of the relief portions according to the present invention provided that the tilting action of external members such as the legs 210, 215 is not obstructed. For example, at the location illustrated in FIG. 16 where an external member (leg 215) to be installed to an attachment hole 41b is installed to the attachment hole 41b, when the outer dimension of the external member (leg 215) is L, it is preferable that the outer dimension of the cutouts (L1) for the relief portions cut out at the upper sides of both sidewalls of the central portion 31 be configured such that (L1)>(L). By forming the relief portions 31e with this configuration, the movable block 30 is less liable to obstruct attachment of the external member to the adapter plate 41. Thus, in the example, it is possible to obtain the effect of realizing a motion guide device 100 to which an external member of any shape can be attached.

As illustrated in FIG. 16, in the movable block 30 of a motion guide device 100 to which a rear leg 215 of the seating apparatus 200 is joined, the brake pin 43 is inserted into the insertion hole 42 formed in the adapter plate 41 and the insertion hole 31d formed in the movable block 30. There are also situations in which, as for example illustrated in FIG. 15, in the movable block 30 of a motion guide device 100 to which a front leg 210 of the seating apparatus 200 is joined, a brake pin 43 is not inserted into the insertion hole 42 formed in the adapter plate 41 or the insertion hole 31d formed in the movable block 30. However, a brake pin 43 may be inserted in the insertion holes 42, 31d in a movable block 30 to which a rear leg 215 is joined. Further, configuration may be adopted in which a brake pin 43 is inserted into the insertion holes 42, 31d in a movable block 30 to which a rear leg 215 is joined, and a brake pin 43 is not inserted into the insertion holes 42, 31d in a movable block 30 to which a front leg 210 is joined.

In this seating apparatus 200, a rear leg 215 is secured to a track rail 20 by inserting a brake pin 43 into the insertion hole 42 in the adapter plate 41 to which the rear leg 215 is joined, the insertion hole 31d formed in the respective movable blocks 30, and a securing hole 21 formed in the track rail 20. By securing the rear leg 215 to the track rails 20, the whole seating apparatus 200 is secured to the track rails 20.

Lifting up a brake pin 43 that has been inserted into an insertion hole 42 in an adapter plate 41 to which a rear leg 215 is joined, the insertion hole 31d formed in the respective movable blocks 30, and a securing hole 21 formed in the respective track rails 20 and removing the brake pin 43 from the securing hole 21 formed in the track rail 20 allows the movable block 30 and the rear leg 215 to move in the direction of movement of the movable block 30. Removing the brake pins 43 from the securing holes 21 formed in the track rails 20 allows the whole seating apparatus 200 to move with respect to the track rails 20.

Thus, with the seating apparatus 200 according to the example, the legs 210, 215 and the seat section 220 are able to be moved to and secured at desired positions on the track rails 20.

In the seating apparatus 200, due to the movable blocks 30 of the motion guide devices 100 being joined to the legs 210, in cases in which, for example, impact load is applied to the seating apparatus 200, as described above, the contact points between the balls 11 and the ball rolling grooves 23 and the loaded ball rolling grooves 33 in the motion guide devices 100 change, and due to the recesses 51 and the holding protrusions 53 coming into contact and the holding protrusions 53 holding onto the recesses 51, the holding protrusions 53 and the recesses 51 bear the impact load (reverse radial load) in a direction that would cause the movable blocks 30 to separate from the track rails 20. With this configuration, in the seating apparatus 200, the track rails 20 and the legs 210, 215 joined to the movable blocks 30 are unable to be separated. After the holding protrusions 53 and the recesses 51 have taken the impact load, when the contact points between the balls 11 and the ball rolling grooves 23 and the loaded ball rolling grooves 33 revert back to that before the change, contact between the recesses 51 and the holding protrusions 53 is broken such that gaps α are formed, and the initial state of the motion guide devices 100 and the seating apparatus 200 is restored.

In this way, since the track rails 20 and the movable block 30 do not separate even when the motion guide devices 100 bear impact load, the track rails 20 and the legs 210, 215 joined to the movable block 30 do not separate. Thus, with the motion guide devices 100 according to the example, convenience is extremely high since when in a normal state in which no external impact load is borne the legs 210, 215 and the seat section 220 are able to move smoothly, and when not in a normal state in which external impact load is borne, since the track rails 20 and the movable block 30 and the legs 210, 215 joined to the movable block 30 do not separate, an exceedingly safe seating apparatus 200 is able to be provided.

The seating apparatus 200, this being one example application of motion guide devices 100 according to the example, has been described in the foregoing. As described above, in the motion guide devices 10, 100 according to the embodiment and the example, the recesses 51 formed in the track rail 20 and the holding protrusions 53 formed to the movable block 30 are able to bear external load in an appropriate manner, and are thus able to be suitably applied to apparatuses to which there is a chance that a strong external load will be applied. In the conventional technology, motion guide devices are made larger so as to be able to withstand a strong external load. However, the motion guide devices 10, 100 described above are able to suitably bear external load so long as the recesses 51 formed in the track rails 20 and the holding protrusions 53 formed to the movable block 30 have been formed, and thus are able to be made compact, without an increase in the size of the motion guide device.

Although a preferred embodiment of the present invention has been described in the foregoing, the technical scope of the present invention is not limited to the scope set forth in the above embodiment. Various modifications or improvements may be made to the above embodiment.

For example, although in the embodiment described above, the recesses 51 are formed in the longitudinal direction of the track rail 20 and the movable block 30 is formed with the holding protrusions 53 that correspond to these recesses 51, configuration may be such that protrusions are formed in the longitudinal direction of the track rails 20 and the movable block 30 is formed with holding recesses that correspond to these protrusions. Note that similarly to when the cover plates 39 are installed, cover plate holding recesses, serving as cap member holding recesses, that correspond to the protrusions formed to the track rails 20 may be formed in the cover plates 39.

Figure 17:
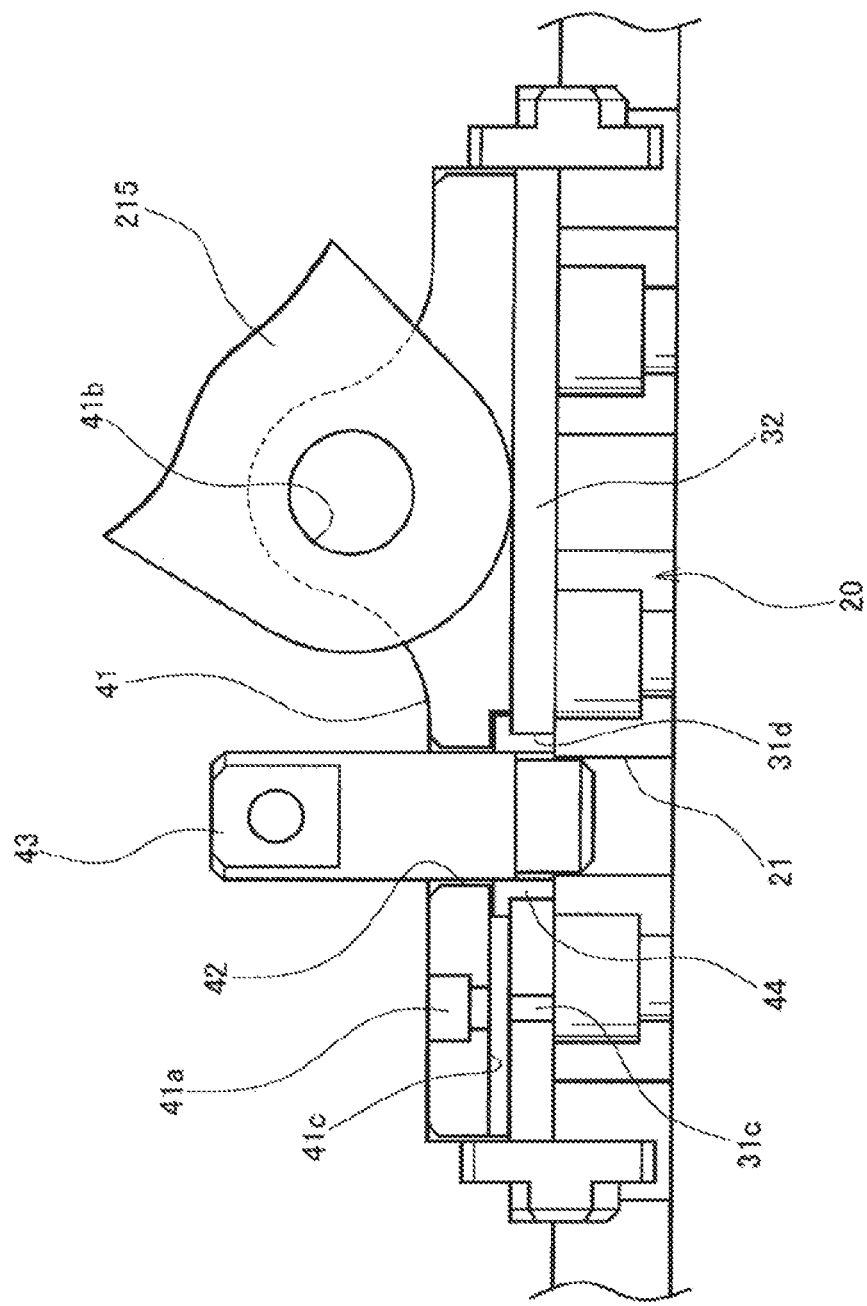
FIG. 17 is a diagram illustrating an example of an improved configuration of an adapter plate according to the example.

Furthermore, for example as illustrated in FIG. 17, the adapter plate 41 according to the example described above can be configured with an insertion groove 41c formed in the bottom face side of the adapter plate 41 such that when the adapter plate 41 is inserted into the adapter plate installation portion 31a while being slid, an inner wall of the insertion groove 41c strikes and makes contact with the bushing 44 at a prescribed position. The formation of an insertion groove 41c such as illustrated in FIG. 17 allows the adapter plate 41 to be positioned by the inner wall of the insertion groove 41c striking and making contact with the bushing 44 when inserted into the adapter plate installation portion 31a, and an operation to attach the adapter plate 41 to the adapter plate installation portion 31a using a bolt is made easier, and thus is preferable. Note that FIG. 17 is a diagram illustrating an example of an improved configuration of an adapter plate according to the example.

Furthermore, for example, although in the example described above the adapter plate 41 is provided separately to the movable block 30, the adapter plate 41 can be integrally formed to the movable block 30.

Figure 18:
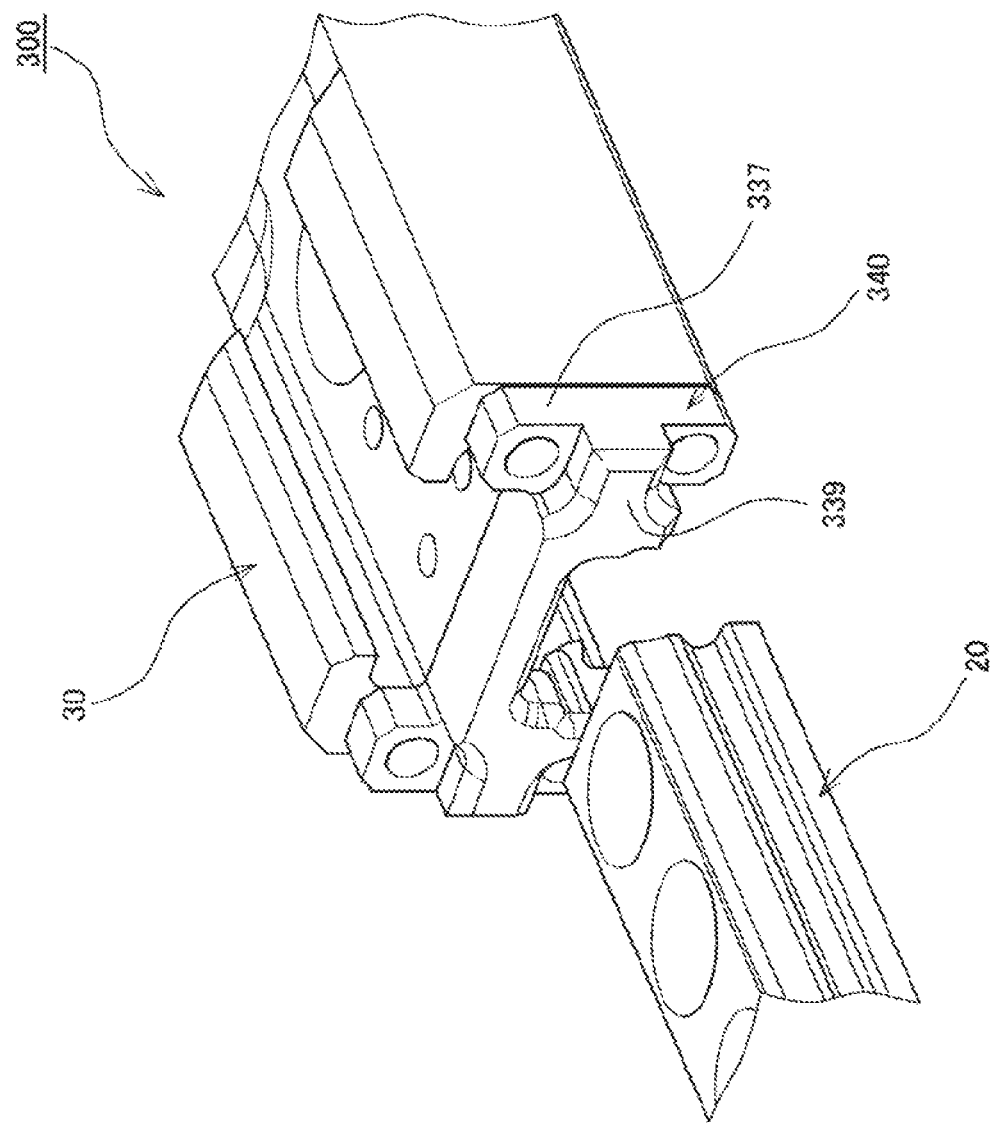
FIG. 18 is a diagram illustrating one example of the various possible configurations of a motion guide device in accordance with an embodiment of the present invention. In particular.
Figure 19:
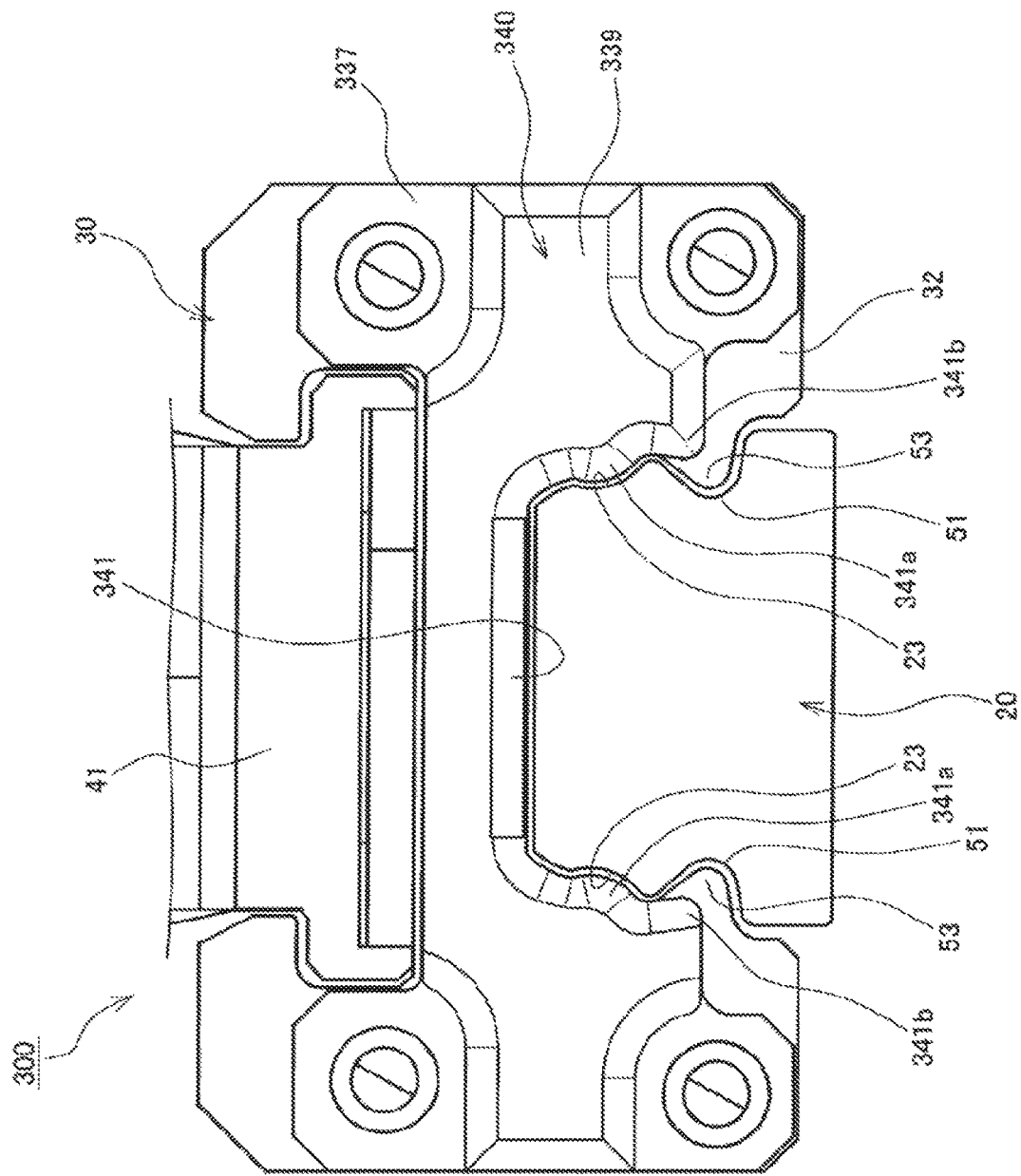
FIG. 19 is a diagram illustrating one example of the various possible configurations of a motion guide device in accordance with an embodiment of the present invention. In particular.
Figure 20:
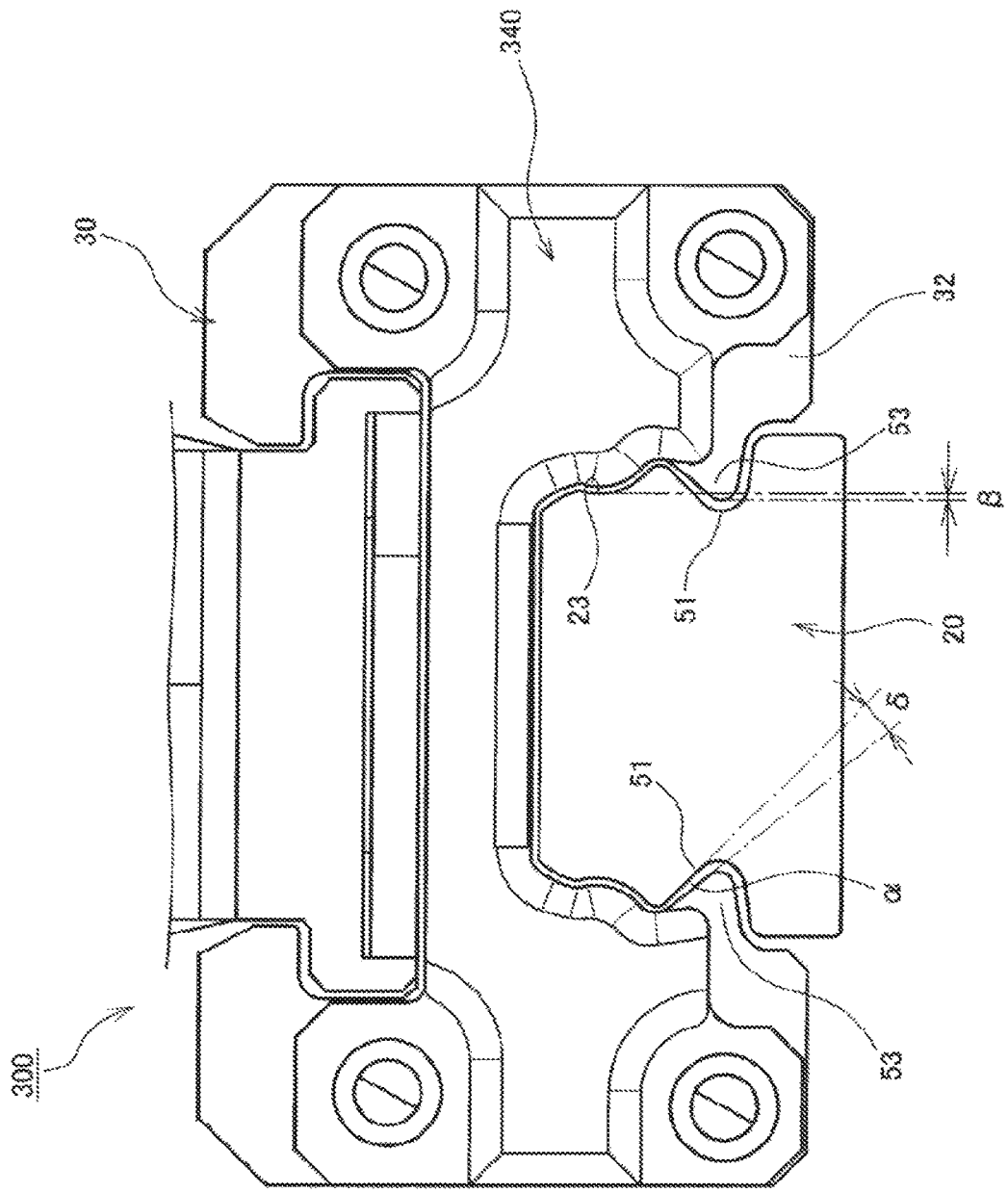
FIG. 20 is a diagram illustrating one example of the various possible configurations of a motion guide device in accordance with an embodiment of the present invention. In particular.

Furthermore, for example, in the example described above, as illustrated in, e.g., FIG. 12, the end plates 37, serving as caps, provided at both the front and rear ends of the movable block 30 in the direction of movement, and the cover plates 39, serving as cap members, are formed as separate members. However, the end plates 37 and the cover plates 39 can be configured as integrated members. FIGS. 18 to 20 illustrate an example of such a modified configuration. FIGS. 18 to 20 are diagrams illustrating one example of the various possible configurations of a motion guide device according to the present invention. In particular, FIG. 18 is a schematic perspective view of relevant parts of a motion guide device according to a modified configuration of the present invention, FIG. 19 is a frontal view of the motion guide device according to the modified configuration of the present invention, and FIG. 20 is a frontal view of a further improved configuration of the motion guide device according to the modified configuration of the present invention.

Note that in the following description, members that are the same as or similar to members in the drawings employed in the description of the embodiment and the example above are denoted using the same reference numerals, and explanation thereof will not be given.

As illustrated in FIG. 18, in a motion guide device 300 according to a modified configuration of the present invention, a pair of cover plate portions 339, serving as cap members, configuring a movable block 30 and a pair of end plate portions 337, serving as caps, to which a pair of turnabout passages 35 are formed are configured as cover end plates 340, which are integrated members. The cover end plates 340 are further improved over the example described above, and for example as illustrated in FIG. 19, at locations on the cover end plates 340 opposing the track rails 20, are formed with a bevel 341. In a motion guide device such as in the present invention, there is demand to be able to remove the movable block 30 is from the track rail 20 to perform a maintenance or adjustment operation, or perform an operation to attach an external member or the like. In such cases, it is necessary to reattach the movable block 30 to the track rail 20, and there is demand to be able to perform this attachment operation smoothly. Accordingly, in the motion guide device 300 according to the modified configuration of the present invention, locations on the cover end plates 340 opposing the track rails 20 are formed with the bevel 341. Since the bevel 341 is provided at both the front and rear ends of the movable block 30 in the direction of movement, when inserting the movable block 30 over the track rail 20, the insertion action is guided following the outer shape of the track rail 20, helping a smooth attachment operation to be realized.

Further, the bevel 341 of the cover end plate 340 according to the modified configuration of the present invention illustrated in FIG. 19 is formed as a location having a shape with a guide portion 341a shaped corresponding to rolling member rolling surfaces 23 formed to the track rail 20 and separated portions 341b that are formed away from the recesses 51 formed in the track rail 20. In this way, by providing the guide portion 341a and the separated portions 341b to the bevel 341, the bevel 341 follows the outer shape of the track rail 20 even more, allowing incorrect insertion to be suitably prevented, such as, for example, when the holding protrusions 53 formed to the sidewalls 32 of the movable block 30 are inserted in the rolling member rolling surfaces 23 formed to the track rail 20.

Furthermore, for example, in the example described above, as illustrated in FIG. 2, with regards to the gap $\alpha$ formed between the recesses 51 and the holding protrusions 53 in the motion guide device 20 according to the embodiment, opposing surfaces of the recesses 51 and the holding protrusions 53 that form the gap $\alpha$ are formed by two surfaces disposed in parallel when the motion guide device 20 is viewed in a vertical cross-section. However, in the motion guide device according to the present invention, the external load exerted on the movable block 30 assembled to the track rail 20 is not only reverse radial load acting the vertical direction, but is also load acting in a direction in which the movable block 30 rotates with respect to the track rail 20. That is, external load is applied from all directions, and thus it is necessary to adopt a configuration that can handle such external load from all directions. Accordingly, in the motion guide device 300 according to the modified configuration of the present invention, with regards to the gap $\alpha$ formed between the recesses 51 and the holding protrusions 53, opposing surfaces of the recesses 51 and the holding protrusions 53 are disposed so as to be non-parallel when the motion guide device 300 is viewed in a vertical cross-section. The opposing surfaces of the recesses 51 and the holding protrusions 53 that are disposed so as to be non-parallel can, for example as illustrated in FIG. 20, be formed as surfaces that oppose one another in a state having an angle $\delta$. Forming the gap $\alpha$ using two such surfaces that are disposed so as to be non-parallel allows external load from to be taken from any direction. Setting the gap $\alpha$ so as to have such a configuration makes it possible to realize the motion guide device 300 according to the modified configuration of the present invention, in which the track rail 20 and the movable block 30 are unable to be separated, while still maintaining fundamental motion guide device guiding functionality.

Furthermore, for example as illustrated in FIG. 20, in the motion guide device 300 according to the modified configuration of the present invention, the holding protrusions 53 formed to the movable block 30 are able to be formed with a size and shape such that insertion in the rolling member rolling surfaces 23 formed to the track rail 20 is not possible. Specifically, configuration may be such that when the motion guide device 30 is viewed in a vertical cross-section with reference to the track rail 20, compared to the position of the bottom surface of the rolling member rolling surfaces 23 furthest to the inside of the rail, the position of the leading end of the holding protrusions 53 furthest to the inside of the rail is positioned further inward of the track rail 20 by a distance $\beta$. That is, the distance between the leading ends of the left and right pair of holding protrusions 53 formed to the movable block 30 is formed so as to be shorter than the distance between the bottom surfaces of the left and right pair of rolling member rolling surfaces 23 formed to the track rail 20 by the amount "$2\times\beta$". Adopting this configuration makes it possible to physically and completely prevent incorrect insertion, such as when the holding protrusions 53 formed to the sidewalls 32 of the movable block 30 are inserted in the rolling member rolling surfaces 23 formed to the track rail 20. Due to having the above configuration, the motion guide device 300 according to the modified configuration of the present invention makes it possible for operations to remove the movable block 30 from the track rail 20 and operations to attach the movable block 30 to the track rail 20 to be smoothly implemented.

It should be clear from the claims that configurations to which other various modifications or improvements have been added are within the technical scope of the present invention.

The invention claimed is:

1. A motion guide device comprising:
   a track member formed with a rolling member rolling surface in a longitudinal direction;
   a moving member that has a loaded rolling member rolling surface opposing the rolling member rolling surface of the track member, a rolling member return passage that extends parallel to a direction in which the rolling member rolling surface extends, and a turnabout passage that connects the loaded rolling member rolling surface and the rolling member return passage together; and
   a plurality of rolling members that roll through an endless circulation passage formed by a loaded rolling member rolling passage made of the rolling member rolling surface and the loaded rolling member rolling surface, the rolling member return passage, and the pair of turnabout passages, wherein
   the track member has a recess formed in the longitudinal direction, the moving member has a holding protrusion that corresponds to the recess formed in the track member, when force is applied in a direction that would cause relative separation of the moving member and the track member, the holding protrusion holds onto the recess such that the moving member and the track member are unable to be separated, a gap is formed between the recess and the holding protrusion, the gap is of a dimension such that reciprocating movement of the moving member relative to the track member is carried out when external load in a direction that would cause relative separation of the moving member and the track member is not being applied, wherein the gap is of a dimension such that the gap is maintained within a range where the rolling members do not fall from the rolling member rolling surface, and reciprocating movement of the moving member relative to the track member is carried out, even in cases in which a change in contact points between the rolling members and the rolling member rolling surface and the loaded rolling member rolling surface arises due to the application of external load in a direction that would cause relative separation of the moving member and the track member, and wherein the gap is configured such that the gap becomes zero and the holding protrusion and the recess takes external load at least immediately prior to the adoption of a state in which there will be a change in the contact points between the rolling members and the rolling member rolling surface and the loaded rolling member rolling surface and the rolling members are to fall from the rolling member rolling surface.

2. The motion guide device according to claim 1, wherein when the motion guide device is viewed in a vertical cross-section, the gap is formed by two surfaces disposed so as to be non-parallel between the recess and the holding protrusion.

3. The motion guide device according to claim 1, wherein the rolling member rolling surface and the loaded rolling member rolling surface are formed as circular arc grooves.

4. The motion guide device according to claim 1, wherein a pair of cap members having a cap member holding protrusion shaped corresponding to the recess formed in the track member are provided at both front and rear ends of the moving member in a direction of movement.

5. The motion guide device according to claim 4, wherein the moving member comprises
the pair of cap members, and
a pair of caps to which the pair of turnabout passages are formed, and
wherein the cap members and the caps are integrally formed with each other.

6. The motion guide device according to claim 4, wherein an outermost surface of the cap members is formed with a bevel at locations opposing the track member.

7. The motion guide device according to claim 1,
wherein both front and rear ends of the moving member in a direction of movement are provided with a cap member, and
wherein each of the cap members comprises
a guide portion shaped corresponding to the rolling member rolling surface formed in the track member, and
a separated portion spaced from and facing the recess formed in the track member.

8. The motion guide device according to claim 1, wherein the holding protrusion is formed with a size and shape such that insertion in the rolling member rolling surface formed in the track member is not possible.

* * * * *